US012770952B2

(12) United States Patent
Jang et al.

(10) Patent No.: US 12,770,952 B2
(45) Date of Patent: Oct. 20, 2026

(54) BATTERY CELL ASSEMBLY AND BATTERY PACK INCLUDING THE SAME

(71) Applicant: LG ENERGY SOLUTION, LTD., Seoul (KR)

(72) Inventors: Sung Hwan Jang, Daejeon (KR); Kyung Hwan Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/612,931

(22) Filed: Mar. 21, 2024

(65) Prior Publication Data

US 2025/0007028 A1 Jan. 2, 2025

(30) Foreign Application Priority Data

Jun. 27, 2023 (KR) ........................ 10-2023-0082724

(51) Int. Cl.
*H01M 10/613* (2014.01)
*H01M 10/625* (2014.01)
*H01M 10/6562* (2014.01)
*H01M 10/658* (2014.01)
*H01M 50/244* (2021.01)
*H01M 50/249* (2021.01)
*H01M 50/505* (2021.01)

(52) U.S. Cl.
CPC ....... *H01M 10/613* (2015.04); *H01M 10/625* (2015.04); *H01M 10/6562* (2015.04); *H01M 10/658* (2015.04); *H01M 50/244* (2021.01); *H01M 50/249* (2021.01); *H01M 50/505* (2021.01); *H01M 2220/20* (2013.01)

(58) Field of Classification Search
CPC ............. H01M 10/613; H01M 10/625; H01M 10/658; H01M 50/244; H01M 50/249; H01M 50/505
See application file for complete search history.

(56) References Cited

U.S. PATENT DOCUMENTS

| | | | |
|---|---|---|---|
| 10,461,383 B2 | 10/2019 | Haag et al. | |
| 2007/0194757 A1* | 8/2007 | Yoon | H01M 10/613 320/150 |
| 2010/0112424 A1 | 5/2010 | Hayashi | |
| 2013/0181826 A1 | 7/2013 | Yang et al. | |

(Continued)

FOREIGN PATENT DOCUMENTS

| | | |
|---|---|---|
| CN | 210349936 U | 4/2020 |
| CN | 213026301 U | 4/2021 |

(Continued)

OTHER PUBLICATIONS

Machine Translation KR1020190129255A. (Year: 2019).*

*Primary Examiner* — Jonathan G Jelsma
(74) *Attorney, Agent, or Firm* — Bryan Cave Leighton Paisner LLP

(57) ABSTRACT

A battery pack including a housing, a battery assembly, and a first cover. The housing includes an opening and a first surface opposite the opening. The battery assembly is accommodated in the housing. The first cover is coupled to the housing and covers the opening. The first side of the battery assembly is coupled to a first side of the first cover. A second side of the battery assembly is spaced apart from the first surface of the housing.

18 Claims, 15 Drawing Sheets

(56) References Cited

U.S. PATENT DOCUMENTS

| | | | | |
|---|---|---|---|---|
| 2015/0367718 | A1* | 12/2015 | Hayashi | B60L 50/66 180/68.5 |
| 2019/0173139 | A1* | 6/2019 | Kellner | H01M 10/6556 |
| 2021/0101464 | A1* | 4/2021 | Matsushima | B60N 2/005 |
| 2021/0339616 | A1* | 11/2021 | Wiemann | H01M 10/6568 |
| 2022/0158281 | A1* | 5/2022 | Rhee | H01M 50/186 |
| 2022/0200083 | A1* | 6/2022 | Yun | H01M 50/557 |
| 2022/0320696 | A1 | 10/2022 | Li et al. | |
| 2023/0057377 | A1 | 2/2023 | Kim et al. | |
| 2023/0216106 | A1* | 7/2023 | Pröll | H01M 10/6563 429/120 |
| 2023/0327235 | A1* | 10/2023 | Beck | H01M 10/613 429/50 |

FOREIGN PATENT DOCUMENTS

| | | | | |
|---|---|---|---|---|
| CN | 113488721 | A * | 10/2021 | H01M 10/658 |
| EP | 3984865 | A1 | 4/2022 | |
| EP | 3998651 | A1 | 5/2022 | |
| JP | 2008192551 | A | 8/2008 | |
| JP | 2014049427 | A | 3/2014 | |
| JP | 6816775 | B2 | 1/2021 | |
| JP | 2022541295 | A | 9/2022 | |
| KR | 10-2015-0110635 | A | 10/2015 | |
| KR | 10-2019-0129255 | A | 11/2019 | |
| KR | 10-2020-0112246 | A | 10/2020 | |
| KR | 10-2021-0017172 | A | 2/2021 | |
| KR | 10-2021-0017274 | A | 2/2021 | |
| KR | 10-2022-0060816 | A | 5/2022 | |
| KR | 20220101580 | A | 7/2022 | |
| KR | 10-2022-0108015 | A | 8/2022 | |
| KR | 10-2022-0117836 | A | 8/2022 | |
| WO | WO-2007097594 | A1 * | 8/2007 | H01M 10/46 |
| WO | 2020-026963 | A1 | 2/2020 | |
| WO | 2022-006894 | A1 | 1/2022 | |

* cited by examiner

Related Art

BATTERY CELL ASSEMBLY AND BATTERY PACK INCLUDING THE SAME

CROSS-REFERENCE TO RELATED APPLICATIONS

The present application claims priority to Korean Patent Application No. 10-2023-0082724 filed on Jun. 27, 2023 in the Republic of Korea, the disclosures of which are incorporated herein by reference.

TECHNICAL FIELD

The present disclosure relates to a battery pack, and more particularly, to a battery pack including one or more battery assemblies.

BACKGROUND

Unlike primary batteries, secondary batteries may be charged or discharged multiple times. Secondary batteries are widely used as energy sources for various wireless devices such as handsets, laptops, and wireless vacuum cleaners. Recently, as the manufacturing cost per unit capacity of secondary batteries has dramatically decreased due to an improvement in energy density and economies of scale, and as a cruising range of battery electric vehicles (BEVs) has increased to the same level as fuel vehicles, the primary use of the secondary batteries has been moving from mobile devices to mobility.

As secondary batteries are used for mobility, the demand for the safety of the secondary batteries is increasing. When an accident such as fire occurs in secondary batteries used for mobility, the accident may endanger the driver's life, and thus research on technology for improving the safety of secondary batteries is indispensable.

When a thermal runaway event occurs inside a battery pack, gas G and flames are directed toward the passenger compartment side, which is risk to passenger safety. In addition, since high-temperature gas and flames are concentrated on a top plate, which is an upper part of the battery pack, a thermal runaway event is easily transmitted to adjacent modules or battery cells.

In addition, since the battery assembly is closely supported on a base plate which is a lower portion of a vehicle, damage may occur in the battery assembly when an impact occurs from below the vehicle in a traveling situation on hard ground such as an unpaved road.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

An object of the present disclosure is to provide a battery pack with improved safety.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

According to exemplary embodiments of the present disclosure for solving the above problems, a battery pack is provided.

In one example, a battery pack may include: a housing comprising an opening and a first surface opposite the opening; a battery assembly accommodated in the housing; and a first cover coupled to the housing and covering the opening. A first side of the battery assembly may be coupled to a first side of the first cover, and a second side of the battery assembly may be spaced apart from the first surface of the housing.

In other aspects, the battery pack described herein may include one or more of the following features. The first side of the battery assembly may be attached to the first side of the first cover. The battery pack may further include a first layer between the battery assembly and the first cover. The first cover may include a cooling channel between the first side of the first cover and a second side of the first cover. The first side of the first cover may be opposite the second side of the first cover. The battery assembly may be fastened to the first cover and/or the housing. The housing may further include a sidewall coupled to a first edge of the first surface. The housing may include a mounting portion on the sidewall The battery assembly may be coupled to the mounting portion. The first cover may be coupled to the mounting portion. The housing may further include an exhaust portion. The housing may further include a support structure on the first surface. The battery assembly may be coupled to the support structure. The battery assembly may further include a cell assembly including a battery cell and a busbar coupled to a first side of the cell assembly. The battery assembly may further include a second cover. The second cover is coupled to a second side of the cell assembly. The battery pack may further include a first layer. The first layer may include a thermal interface material (TIM). The TIM may include a thermal resin, and the first layer may be on a surface of the second cover. The battery assembly may further include: a third cover coupled to a third side of the cell assembly; and a cooling portion on at least one of the second cover or the third cover. The battery assembly may further include a second cover coupled to a second side of the cell assembly and a third cover coupled to a third side of the cell assembly. The second cover may include a first shape and the third cover may include a second shape. The first shape and the second shape may be configured to correspond with each other for coupling. The battery assembly may include a first cell assembly and a second cell assembly. The first cell assembly may include a first busbar and a second cell assembly comprise a second busbar. The first cell assembly may be coupled to the second cell assembly via the first busbar and the second busbar. The battery assembly may further include a busbar frame including the busbar.

In another example, a vehicle may include: a battery pack and a frame. The battery pack may include: a housing including an opening and a surface opposite the opening; a cover configured to cover the opening; and a battery assembly coupled to the cover and spaced part from the surface. The battery pack may be accommodated in the frame. A passenger compartment may be provided above at least a first portion of the battery pack. The frame may be under at least a second portion of the battery pack.

In yet another example, a battery assembly may include: a cell assembly comprising a battery cell; a first cover coupled to a first side of the cell assembly; a second cover coupled to a second side of the cell assembly; and a layer between the second cover and the second side of the cell assembly. The first cover may include a first cooling portion.

The second cover may include a second cooling portion. The first cooling portion may include a ventilation opening. The second cooling portion may include a cooling channel.

In yet another example, a battery pack may include a battery assembly including a plurality of battery cells, and a pack housing configured to accommodate the battery assembly, wherein the pack housing includes a top plate by which an upper surface of the battery assembly is suspended and supported, and a lower pack housing including a bottom plate opposite to the top plate and coupled to the top plate, and a free volume is provided between a lower surface of the battery assembly and the bottom plate.

The upper surface of the battery assembly may be closely coupled to a lower surface of the top plate.

The battery pack may further include a thermal interface material (TIM) layer, which includes a thermal resin, between the battery assembly and the top plate, and the battery assembly may be closely coupled to and supported on the lower surface of the top plate by the TIM layer.

The top plate may have a plurality of cooling channels.

The battery assembly may be fastened to the top plate and/or the lower pack housing.

The lower pack housing may have a sidewall coupled to surround the bottom plate, and an assembly mounting portion configured to support a side surface of the battery assembly, which is perpendicular to the upper surface of the battery assembly, may be provided on the sidewall.

The top plate may be seated on an upper surface of the assembly mounting portion.

The lower pack housing may include an exhaust device.

A battery support may be provided on the bottom plate, and the battery assembly may be supported by the battery support to be spaced apart from an upper surface of the bottom plate.

The battery assembly may include a battery cell assembly including the plurality of battery cells, and a plurality of busbars coupled to at least one side surface of the battery cell assembly or a busbar frame including the plurality of busbars.

The battery assembly may further include a module case configured to accommodate the battery cell assembly.

The battery pack may further include a TIM layer, which includes a thermal resin, on an inner surface of the module case in contact with at least one of an upper surface and a lower surface of the battery cell assembly.

A cooling device may be provided in at least one of an upper case in contact with the upper surface of the battery cell assembly and a lower case in contact with the lower surface of the battery cell assembly in the module case.

The battery assembly may include a first side plate coupled to a first side surface of the battery cell assembly and a second side plate coupled to a second side surface of the battery cell assembly.

The first side plate and the second side plate may have complementary structures that are engaged with each other.

The battery assembly may include a plurality of battery cell assemblies connected in a longitudinal direction of the battery assembly.

According to another exemplary embodiment of the present disclosure, an electric vehicle includes the above described battery pack, and a vehicle body frame on which the battery pack is mounted, wherein a passenger compartment is disposed at the top plate of the battery pack, and the vehicle body frame is disposed at the bottom plate of the battery.

In a battery pack according to exemplary embodiments of the present disclosure, a battery assembly is suspended and supported by a top plate positioned adjacent to a passenger compartment of a vehicle. In addition, a free volume is provided between a lower surface of the battery assembly and a bottom plate of the battery pack positioned adjacent to a vehicle bottom.

Accordingly, even when a thermal runaway event occurs, since high-temperature gas generated from the battery assembly moves to the free volume, passengers in the passenger compartment can be protected.

Also, even when an impact is applied to the bottom plate of the battery pack from below the vehicle, since the battery assembly is spaced apart from the bottom plate by the free volume, structures in the battery pack, such as the battery assembly, can be effectively protected.

The effects obtainable from exemplary embodiments of the present disclosure are not limited to the above-described effects, and other effects which are not described herein may be derived by those skilled in the art from the following description of the exemplary embodiments of the present disclosure. That is, unintended effects according to implementation of exemplary embodiments of the present disclosure may be devised by a person skilled in the art through the exemplary embodiments of the present disclosure.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

DETAILED DESCRIPTION

Figure 1:
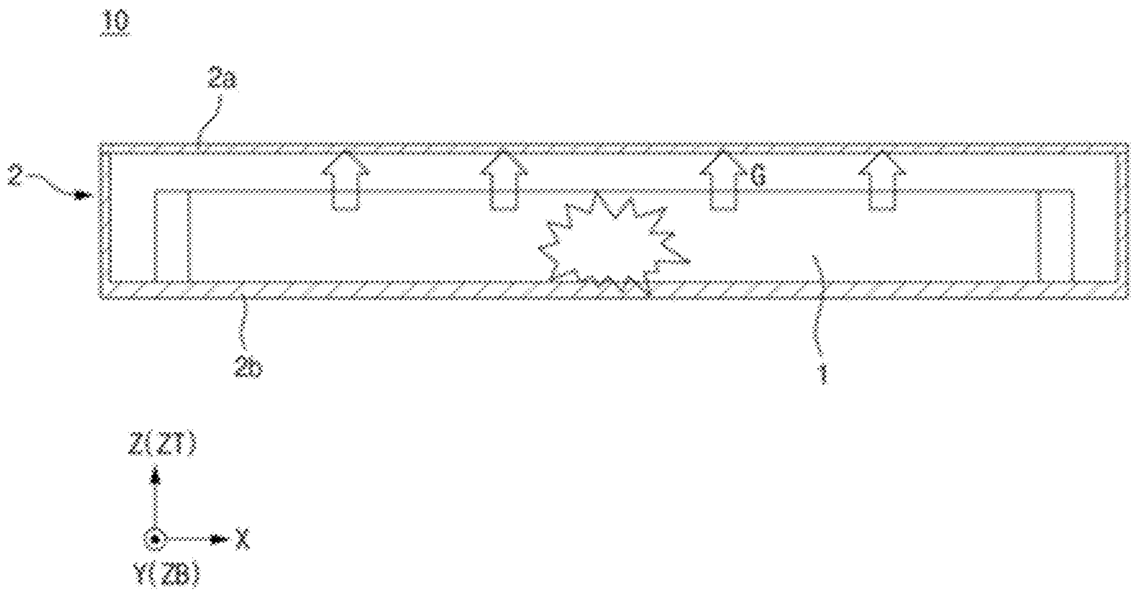
FIGS. 1 and 2 are cross-sectional views of a battery pack.

Hereinafter, exemplary embodiments of the present disclosure will be described in detail with reference to the accompanying drawings. Prior to the description, it should be understood that terms or words used in the present specification and the appended claims should not be construed as being limited to general and dictionary meanings, but interpreted based on the meanings and concepts corresponding to technical aspects of the present disclosure on the basis of the principle that the inventor can appropriately define the concepts of terms in order to explain his or her disclosure in the best way.

Therefore, the exemplary embodiments described in the specification and the configurations shown in the drawings are merely the most exemplary embodiments of the present disclosure and do not represent all the technical ideas of the present disclosure. Thus, it is to be understood that there may be various equivalents and variations in place of them at the time of filing the present application.

In addition, in describing the present disclosure, when it is determined that detailed descriptions of related known functions or configurations may obscure the gist of the present disclosure, the detailed descriptions thereof will be omitted.

The exemplary embodiments of the present disclosure are provided to more fully describe the present disclosure to those skilled in the art, and the shapes and sizes of components in the drawings may be exaggerated, omitted, or schematically illustrated for clearer description. Thus, the size or proportion of components does not entirely reflect the actual size or proportion.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The terms including the ordinal number such as "first", "second" and the like, may be used to distinguish one element from another among various elements, but not intended to limit the elements by the terms. The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a nonexclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±5% of a stated or understood value.

In addition, throughout the specification, when a portion is referred to as being "connected" or "coupled" to another portion, it is not limited to the case that they are "directly connected" or "directly coupled", but it also includes the case where they are "indirectly connected" or "indirectly coupled" with one or more elements being arranged between them.

Figure 2:
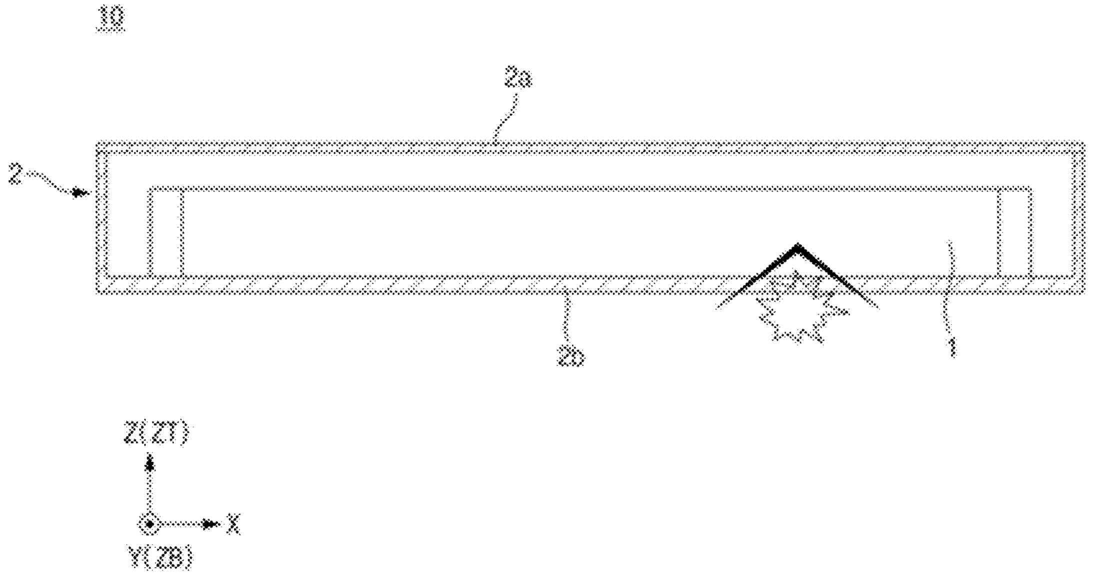
Related Art FIG. 2

FIGS. 1 and 2 are cross-sectional views of a conventional battery pack 10.

As shown, in the conventional battery pack 10, a battery assembly 1 such as a battery module may beis mounted in a lower pack housing 2 including a base plate 2*b* (bottom plate). A top plate (pack cover) 2*a* may beis mounted on an upper portion of the lower pack housing 2 to cover the battery module. When the battery pack 10 is mounted in a vehicle, a passenger compartment may beis disposed above the top plate 2*a*. In addition, a vehicle frame may beis positioned below the base plate 2*b*, and thus the battery pack 10 may beis mounted on the vehicle frame. As shown in FIG. 1, when a thermal runaway event occurs inside a battery pack, gas G and flames are directed toward the passenger compartment side, which is risk to passenger safety. In addition, since high-temperature gas and flames are concentrated on a top plate, which is an upper part of the battery pack, a thermal runaway event is easily transmitted to adjacent modules or battery cells. In addition, as shown in FIG. 2, since the battery assembly is closely supported on a base plate which is a lower portion of a vehicle, damage may occur in the battery assembly when an impact occurs from below the vehicle in a traveling situation on hard ground such as an unpaved road.

Figure 3:
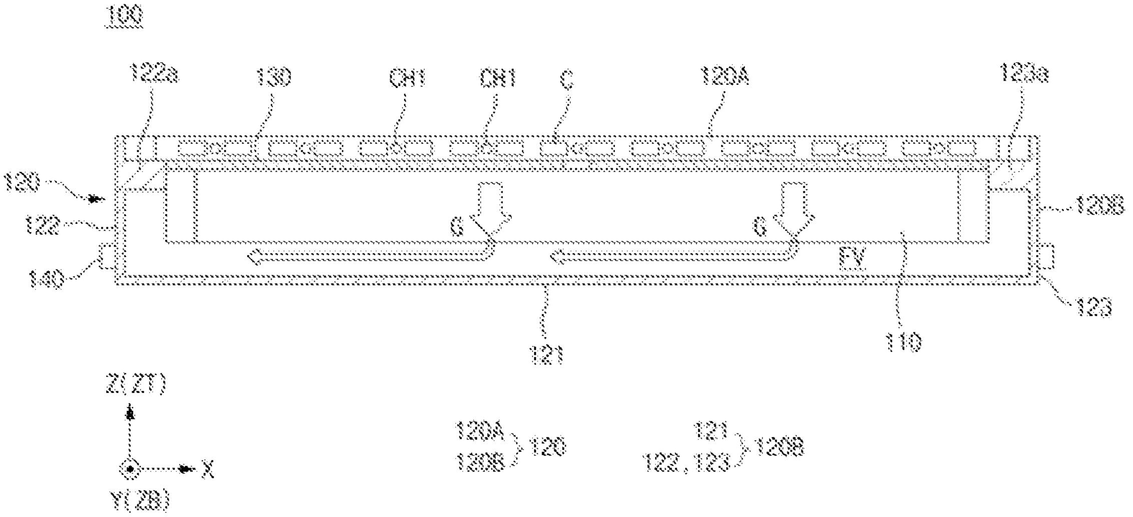
FIGS. 3 and 4 are cross-sectional views of a battery pack according to an exemplary embodiment of the present disclosure.
Figure 4:
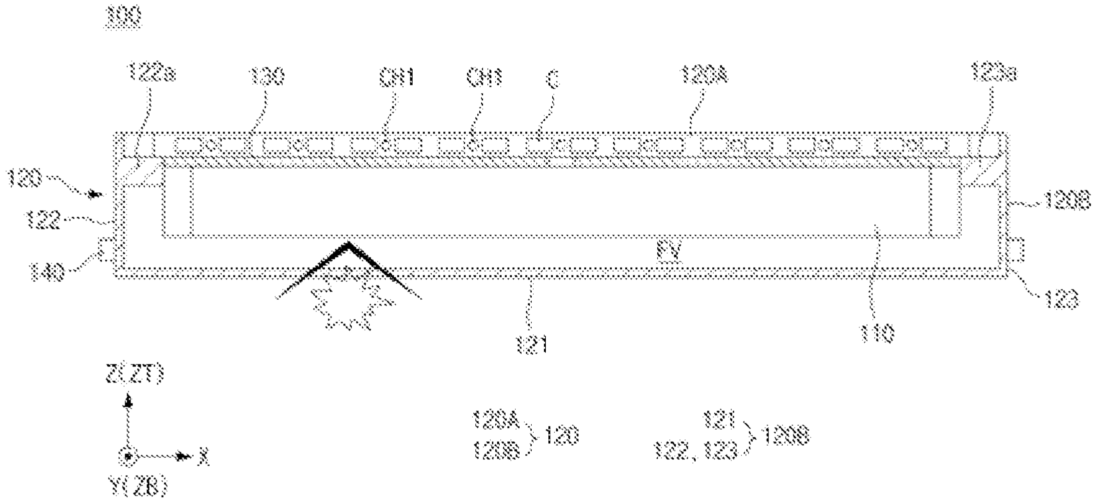

FIGS. 3 and 4 are views for describing a battery pack according to an exemplary embodiment of the present disclosure.

A battery pack 100 of the present exemplary embodiment includes a battery assembly 110 and a pack housing 120.

In FIGS. 3 and 4, X direction indicates a longitudinal direction of the battery assembly 110. Y direction indicates a width direction of the battery assembly. Z direction indicates a height direction of the battery pack. ZT direction is a direction toward the top of the Z direction, and ZB direction is a direction opposite the ZT direction. The battery assembly 110 may be any one of the battery assemblies shown in FIGS. 6(*a*)-14 in accordance with embodiments of the present disclosure, but is not limited thereto.

For purposes of clarity of explanation and illustration, the battery assembly 110 will be described hereinafter in relation to the battery assembly 110A shown in FIG. 6A. Accordingly, the battery assembly 110 and 110A are referenced interchangeably with respect to FIG. 6A. However, the battery assembly 110 of the present disclosure is not limited to the battery assembly 110A.

Figure 6A:
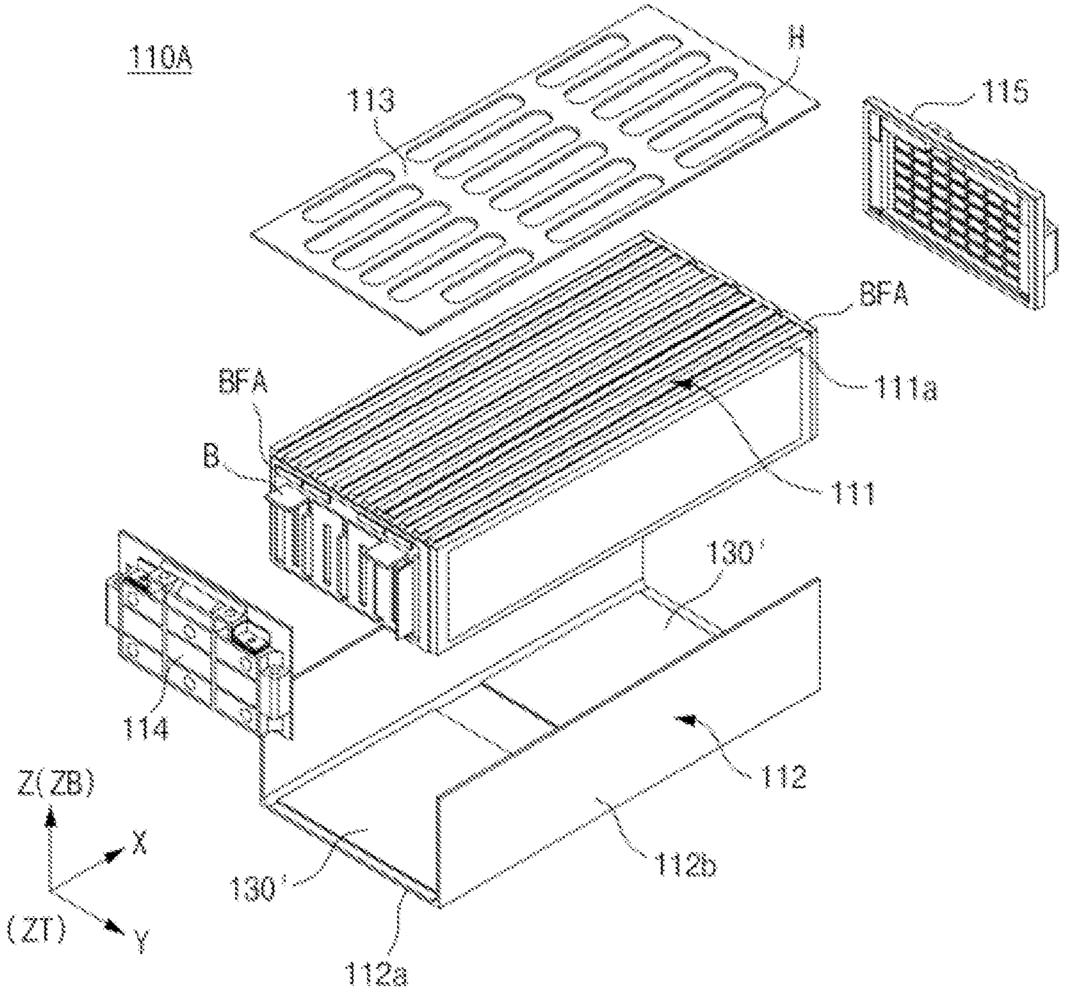
FIG. 6A is a perspective view of a battery assembly accommodated in a battery pack according to an exemplary embodiment.

Referring to FIG. 6A, the battery assembly 110A may include a plurality of battery cells 111*a*.

The plurality of battery cells 111*a* may be a basic unit of a lithium ion battery, for example, a secondary battery. Each of the plurality of battery cells 111*a* may include an electrode assembly, an electrolyte, and a case. The plurality of battery cells 111*a* may be classified as lithium ion batteries, lithium ion polymer batteries, lithium polymer batteries, and the like according to the configuration of an electrode assembly and an electrolyte. Lithium ion polymer batteries are increasing their market share among secondary batteries because the lithium ion polymer batteries are less likely to leak an electrolyte and are easy to manufacture.

Each of the plurality of battery cells 111*a* may be any one of a cylindrical battery cell, a prismatic battery cell, or a pouch-type battery cell, but is not limited thereto. An electrode assembly of the cylindrical battery cell may be arranged or embedded in a cylindrical metal can. An electrode assembly of the prismatic battery cell may be arranged or embedded in a prismatic metal can. However, any other suitable shape, size, and/or material for the can may be utilized. An electrode assembly of the pouch-type battery cell may be arranged or embedded in a pouch case including an aluminum laminate sheet.

An electrode assembly arranged or embedded in a battery case may include a positive electrode, a negative electrode, and a separator interposed between the positive electrode and the negative electrode. Electrode assemblies may be classified as jelly roll-type electrode assemblies or stack-type electrode assemblies depending on the form or shape of the electrode assembly. The jelly roll-type electrode assembly may be formed by winding a positive electrode, a negative electrode, and a separator interposed therebetween. The stack-type electrode assembly may include a plurality of positive electrodes, a plurality of negative electrodes, and a plurality of separators interposed therebetween.

According to exemplary embodiments, the plurality of battery cells 111*a* may be connected in series and/or parallel. For example, the plurality of battery cells 111*a* may be connected in series. Alternatively, the plurality of battery cells 111*a* may be connected in parallel. Additionally or alternatively, the plurality of battery cells 111*a* connected in parallel may constitute groups, and the groups of the plurality of battery cells 111*a* may be connected in series.

The plurality of battery cells 111*a* may be grouped together to obtain required or desired electric capacitance. For example, a plurality of prismatic battery cells or a plurality of pouch-type battery cells may be stacked to form a battery cell assembly in the form of a cell stack. A plurality of cylindrical battery cells may be inserted through a plurality of insertion holes of a support frame installed in a module case to form a battery cell assembly.

In some embodiments, a battery cell assembly 111 may include a compression pad between the battery cells 111*a* to prevent swelling. Alternatively, a thermal barrier may be provided between the battery cells 111*a*. For example, the thermal barrier may include a flame retardant material such as a ceramic or coated glass material.

The battery assembly 110A may further include busbars (e.g., B) for electrically connecting the plurality of battery cells 111*a* to each other. The busbars may include inter-busbars connected to the battery cells to electrically connect the battery cells 111*a* together or may include terminal busbars for electrically connecting the battery assembly with an external electric device.

The busbars may be mounted on a busbar frame. For example, a busbar frame BFA may be provided on at least one side surface of the battery cell assembly 111. The busbar frame BFA may be provided on one side surface of the battery cell assembly 111 (e.g., a battery cell stack) of the pouch-type battery cells. In the case of a battery cell assembly including pouch-type battery cells from which electrode leads are drawn out in a single direction, a busbar frame may be provided on one side of a cell stack (e.g., a side surface of a cell stack) from which the electrode leads may be drawn out. In the case of a battery cell assembly including pouch-type battery cells from which electrode leads are drawn out in multiple directions (e.g., two directions), a busbar frame may be provided on multiple side surfaces (for example, a front surface and a rear surface) of a stack from which the electrode leads may be drawn out.

Alternatively, in the case of prismatic battery cells, since electrode leads are usually drawn out from one surface (for example, an upper surface) of a stack, a busbar frame may be provided on the one surface.

In the case of cylindrical battery cells, busbars may be provided at sides of a battery cell assembly where electrode terminals may be drawn-out. In this case, each busbar may be installed on a structure such as a busbar frame.

An end plate 114 may be provided to cover the busbar frame BFA or to cover at least one side surface of the battery cell assembly. For example, in the case of a pouch-type battery cell stack, an end plate 114, 115 may be provided to cover a busbar frame BFA.

In the case of prismatic battery cells, an end plate may be installed at each of a front end and a rear end of battery cells in a stacking direction, but is not limited thereto.

According to one exemplary embodiment, the battery assembly 110 may further include housings or cases for accommodating the battery cell assembly 111 and the busbar frame BFA.

For example, the cases may be module cases 112 and 113, and the battery assembly 110 may be a battery module.

As shown in FIG. 6A, the battery assembly 110 may have a shape in which at least a portion of the module cases 112 and 113 surrounding upper, lower, left, and right sides of the plurality of battery cells or the battery cell assembly 111 include openings at sides where bus bar frames BFA are provided.

In some embodiments, the battery pack of the present disclosure may not include the module cases 112 and 113 surrounding upper, lower, left, and right sides of the battery cells or the battery cell assembly 111.

Alternatively, a case or a housing may be provided to cover only some of the upper, lower, left, and right sides of the battery cells or the battery cell assembly 111. For example, two side plates may be provided to cover the left and right sides of the battery cells or the battery cell assembly 111. In this case, the upper and/or lower surfaces of the battery cells or the battery cell assembly 111 may be open or exposed.

Referring back to FIG. 3, the pack housing 120 may include a space for accommodating the battery assembly 110. The pack housing 120 may include a lower pack housing 120B including a bottom plate 121 (e.g., a bottom side or wall of the lower pack housing 120B as show in FIG. 3) and a top plate (or a cover or a lid) 120A coupled to cover the lower pack housing 120B.

As shown in FIG. 3, the bottom plate 121 may form a bottom portion or side of the battery pack and may be supported by a vehicle frame when the battery pack 100 is installed in a vehicle. Sidewalls 122 and 123 may be provided around the bottom plate 121. In FIGS. 3 and 4, the sidewalls 122 and 123 are shown at both sides of the bottom plate 121. However, sidewalls may also be provided on front and rear surfaces of the bottom plate 121. The sidewalls at the front and rear surfaces are not shown in FIGS. 3 and 4 for clarity of illustration and explanation. The bottom plate 121 and the sidewalls at front, rear, and both sides may constitute the lower pack housing 120B. The bottom plate 121 and the sidewalls may be coupled to each other through, for example, such a friction stir welding method, but is not limited thereto. Although the terms such as, front, rear, left, right, etc. are used throughout this disclosure to describe position, location, and/or orientation of various components of the battery pack 100, the various components may also be referred by using ordinal numbers such as "first", "second", and the like, to distinguish one position, location and/or orientation from another, but not intended to limit the position, location, and/or orientation by the terms.

The top plate 120A may be coupled to an upper portion of the lower pack housing 120B. That is, the top plate 120A may be a pack lid for covering the lower pack housing 120B and the battery assembly 110.

A passenger compartment of a vehicle may be positioned above the top plate 120A.

An upper surface of the battery assembly 110 may be suspended and supported by, or attached or fixed to, the top plate 120A. That is, the battery assembly 110 may be coupled to a lower surface of the top plate 120A. In addition, a free volume FV is provided between a lower surface of the battery assembly 110 and the bottom plate 121. That is, the free volume FV may be defined as a separation space provided between the exposdedexposed portions of the battery assembly 110 and the bottom plate 121 opposite to the top plate 120A, as shown in FIG. 3. For example, the battery assembly 110 may be spaced apart for a surface of the bottom plate 121 at a distance. In some embodiments, a distance between the bottom plate 121 and the battery assembly 100 may be selected in the range of 5 to 30 mm, 8 to 20 mm, or 10 to 16 mm, but is not limited thereto.

If the bottom plate is thick or the rigidity of the bottom plate is high, the height may be reduced.

Accordingly, the battery pack 100 of the present disclosure has a support structure in which the battery assembly 110 is suspended and supported by the top plate 120A. In addition, the free volume FV may be provided between the bottom of the battery pack (bottom plate 121) and the battery assembly 110. Accordingly, any gas and flames generated, for example, in a thermal runaway situation, may move or communicate in or through the free volume FV. That is, the free volume FV becomes a venting path through which high-temperature gas and flames can move.

In addition, even when a strong impact occurs when a foreign material hits a lower portion of a vehicle in a traveling situation on hard ground such as an unpaved road, the impact can be absorbed by the free volume FV. Therefore, the battery assembly 110 can be prevented from being damaged by the impact. The free volume FV may be defined as an empty space between the lower surface of the battery assembly 110 and an inner surface of the bottom plate 121. In addition, the empty space may be referred to as the free volume FV in the sense that, even when the bottom plate 121 or the like is deformed toward the battery assembly 110, for example, due to an external impact from below, deformation may be tolerated to some extent within the space. In one embodiment, the free volume FV may not include any structural components. Alternatively, a structure for supporting the battery assembly 110 or the like may be installed in a portion of the free volume FV. In one embodiment, when a structure is installed in a portion of the free volume FV, a volume or distance sufficient to allow deformation of the bottom plate 121 or the like may be provided between the battery assembly 110 and the bottom plate 121.

In one embodiment, a height of the free volume FV, that is, a length or distance between the bottom plate 121 and the battery assembly 110, may be provided as desired to sufficiently absorb an impact. The height of the free volume FV may vary depending on the position of measurement on the bottom plate 112. For example, the height or distance of the free volume FV between the mounting portion **122*a* or 123*a* and an inner surface of the bottom plate 112 may be greater than the height or distance between a bottom surface of the battery assembly 110 and the inner surface of the bottom plate 112, as shown in FIG. 3, but the variation in the height or distance in the free volume FV is not limited thereto. In some embodiments, a distance between the bottom plate 121 and the battery assembly 100** may be selected in the range of 5 to 30 mm, 8 to 20 mm, or 10 to 16 mm, but is not limited thereto.

The height of the free volume FV may be determined based on a thickness and rigidity of a vehicle frame or the bottom plate 121, the specifications or size of the battery pack, and an amount and discharge speed of gas generated during thermal runaway. For example, when the thickness of the vehicle frame or the bottom plate 121 is large, or rigidity thereof is strong, the size or height of the free volume FV may be relatively reduced. When the thickness is small, or rigidity is weak, the possibility of deformation of the bottom plate 121 is high, and thus the height of the free volume FV needs to be increased to protect the battery assembly 110. In one embodiment, the thickness of the bottom plate 121 may be selected in the range of 1 to 5 mm. In another embodiment, a thickness of the bottom plate 121 having a range between 1 to 3 mm may be used. Additionally, if the bottom plate 121 is made of steel, for example, the thickness of the bottom plate may be reduced to 0.8 mm. Of course, the thickness of the bottom plate 121 is not limited to the ranges described above, and may be selected to have any suitable thickness based on the application and design of the battery pack.

In addition, when the size of the battery pack is large according to the specifications of the battery pack, a relatively large free volume FV can be secured. When the size of the battery pack is small, since the securable free volume FV may be small, the thickness and rigidity of the bottom plate 121 may need to be relatively increased.

Furthermore, when the size/height of the free volume FV is too small, a gas discharge space becomes small, and thus the internal pressure of the battery pack may rapidly increase during thermal runaway. Accordingly, the size and height of the free volume FV may be determined in consideration of an amount and discharge speed of generated gas.

The maximum height of the free volume may be determined according to a degree of damage that the battery cell may withstand while preventing or reducing potential damage to the battery assembly or preventing or reducing thermal runaways. For example, when a damage tolerance of the battery cell is 1 mm, the free volume FV may be determined such that the battery cell is not deformed by more than 1 mm when the bottom plate is deformed and may presses or contact the lower surface of the battery cell. In this case, an amount of deformation of the bottom plate may vary according to the thickness or rigidity of the bottom plate 121. Accordingly, the size or height of the free volume may be determined in consideration of both the tolerance limit of the battery cell and the thickness and rigidity of the bottom plate. In addition, when the battery cell is accommodated in a separate case (for example, the module case) inside the battery pack, even when the bottom plate is impacted, the possibility of damage to the battery cell protected by the module case is further reduced. Therefore, in this case, the height of the free volume can be made smaller.

The upper surface of the battery assembly 110 may be closely coupled to a lower surface of the top plate 120A. When there is a space between the battery assembly 110 and the top plate 120A, high-temperature gas may be introduced into the space during thermal runaway, and thus heat and flames may propagate to the battery assembly 110. In addition, heat and flames may be transferred to the top plate 120A and affect the passenger compartment above the top plate 120A. Therefore, the upper surface of the battery assembly 110 may be closely coupled to the lower surface of the top plate 120A so that gas or flames generated inside the battery pack will be guided to and communicated through the free volume FV below the battery assembly 110.

Still referring to FIG. 3, a thermal interface material (TIM) layer 130 including a thermal resin may be provided between the battery assembly 110 and the top plate 120A. The TIM layer 130 may be interposed between the battery assembly 110 and the top plate 120A. The TIM layer 130 may mutually fix or couple the battery assembly 110 and the top plate 120A together. Accordingly, the battery assembly 110 may be closely coupled to and supported on the lower surface of the top plate 120A by the TIM layer 130. Additionally, the TIM layer 130 may prevent an air layer from being formed between the battery assembly 110 and the top plate 120A. The TIM layer 130 may be configured to transfer heat between the battery assembly 110 and the top plate 120A. Accordingly, heat generated from the battery assembly 110 may be transferred toward the top plate 120A. When the top plate 120A is equipped with an appropriate cooling device, heat from the battery assembly 110 may be transferred to the cooling device through the TIM layer 130.

As the cooling device, a plurality of cooling channels CH1 may be provided in the top plate 120A.

As shown in FIGS. 3 and 4, the top plate 120A may include the plurality of cooling channels CH1 and a plurality of cavities C. Each of the plurality of cooling channels CH1 and the plurality of cavities C may extend in the Y direction.

According to exemplary embodiments, the plurality of cooling channels CH1 may be configured to provide a path through which a cooling fluid may flow. The cooling fluid may be a fluid for cooling a plurality of battery assemblies 110, such as water, air, or a coolant, but is not limited thereto. The plurality of cooling channels CH1 may be spaced apart from each other in the X direction. The plurality of cooling channels CH1 may be interposed between the plurality of cavities C.

The plurality of cavities C are empty spaces formed inside the top plate 120A. Due to the formation of the plurality of cavities C, the weight of the top plate 120A may be reduced, and thus an energy density of the battery pack 100 may be increased. In one embodiment, an energy density of the battery pack 100 may be defined as follows:

Energy density of a battery pack=capacity of a battery pack/weight of a battery pack. The plurality of cavities C may be spaced apart from each other in the X direction.

Although not shown in the figures for clarity of illustration and explanation, the cooling channels CH1 may be connected to a vehicle cooling system. In one embodiment, cooling ports may be connected to the cooling channels CH1. The cooling ports may be connected to the vehicle cooling system through a pipe or the like.

When the TIM layer 130 is disposed between the upper surface of the battery assembly 110 and the top plate 120A, and the cooling channels CH1 are provided in the top plate 120A, any heat generated by the battery assembly 110 may be efficiently dissipated. In addition, when the TIM layer 130 and the cooling channels CH1 are disposed at an upper side of the battery pack, heat generated in the battery pack 100 may be prevented or reduced from being transferred toward the passenger compartment. Accordingly, the safety of an electric vehicle can be improved.

In the battery pack 100 of FIGS. 3 and 4, the battery assembly 110 is fixed to the top plate 120A through an adhesive member such as the TIM layer 130. However, in consideration of the load of the battery assembly 110, the top plate 120A and the battery assembly 110 may be fastened through a fastening member. For example, when the battery assembly 110 includes the module cases 112 and 113, the top plate 120A and the module cases 112 and 113 may be fastened through the fastening member, and thus the battery assembly 110 may be suspended and supported by the top plate 120A. Alternatively, the battery assembly 110 may be coupled to the top plate 120A using both the TIM layer 130 and the fastening member. In this case, the load of the battery assembly 110 may be more uniformly distributed to the top plate 120A.

If necessary, the battery assembly 110 may be coupled to the lower pack housing 120B. For example, the sidewalls of the lower pack housing 120B may be coupled to side surfaces of the battery assembly 110. In this case, assembly mounting portions 122*a* and 123*a* may be provided on the sidewalls 122 and 123 to support the side surfaces of the battery assembly. The assembly mounting portions 122*a* and 123*a* may protrude from the sidewalls 122 and 123 to support the side surfaces of the battery assembly, which is perpendicular to the upper surface of the battery assembly 110. To this end, the assembly mounting portions 122*a* and 123*a* may extend in the X direction, the Y direction, or the X and Y directions. When the assembly mounting portions 122*a* and 123*a* extend in the Y direction, the assembly mounting portions 122*a* and 123*a* may be provided on the front and rear sidewalls (not shown) of the lower pack housing 120B.

Side surfaces of the assembly mounting portions 122*a* and 123*a* facing the battery assembly 110 may be in close contact with the side surfaces of the battery assembly to support the battery assembly 110. In this case, since the upper surface of the battery assembly is supported by the top plate 120A and the side surfaces thereof are supported by the assembly mounting portions 122*a* and 123*a*, the load of the battery assembly 110 can be easily distributed. Accordingly, even a heavier battery assembly 110 can be firmly supported inside the battery pack 100. Even when the TIM layer is not used or the TIM layer is used, the battery assembly 110 may be coupled to the top plate 120A and/or the assembly mounting portions 122*a* and 123*a*. For example, the battery assembly 110 may be fastened through a fastening member or welded and coupled to the top plate 120A and/or the assembly mounting portions 122*a* and 123*a*. Alternatively or additionally, an adhesive material may be utilized to secure the battery assembly 110 to the top plate 120A.

In one embodiment, the top plate 120A may be seated on upper surfaces of the assembly mounting portions 122*a* and 123*a*. Further, the top plate 120A may be coupled to the sidewalls 122 and 123 of the lower pack housing 120B. In this example, the assembly mounting portions 122*a* and 123*a* may be provided to distribute the load of the top plate 120A and mount the top plate 120A. The assembly mounting portions 122*a* and 123*a* may extend from the sidewalls toward the inside of the pack. As shown in FIG. 3, A space may be provided between upper ends of the sidewalls 122, 123 and the upper surfaces of the assembly mounting portions 122*a* and 123*a*, and the top plate 120A may be seated in the space. That is, the top plate may be seated in the space provided above the upper surfaces of the assembly mounting portions 122*a* and 123*a* and supported by the assembly mounting portions 122*a*, 123*a*. The top plate 120A may be coupled to the upper surfaces of the assembly mounting portions 122*a* and 123*a* and/or the sidewalls 122 and 123 through a fastening member, welding, or the like. Accordingly, the load of the top plate 120A may be more uniformly distributed to the lower pack housing 120B. The assembly mounting portions 122*a* and 123*a* provide support surfaces for both the battery assembly and the top plate. Therefore, the battery assembly and the top plate can be simultaneously supported by the assembly mounting portions 122*a* and 123*a*.

The assembly mounting portions 122*a* and 123*a* may also function to block gas in the pack moving to the top plate 120A. For example, the assembly mounting portions 122*a* and 123*a* are formed in the form of a quadrangular or rectangular frame surrounding the battery assembly 110, thereby preventing gas from coming into direct contact with the top plate 120A.

In one embodiment, in order to distribute the load of the battery assembly and secure the free volume FV, a predetermined support structure may also be disposed on the bottom plate 121.

Figure 5:
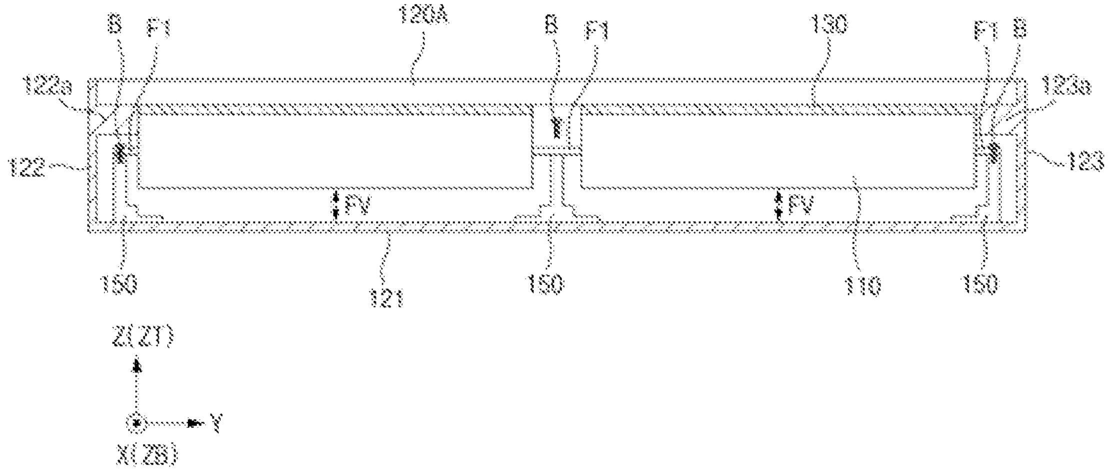
FIG. 5 is a cross-sectional view of the battery pack according to an exemplary embodiment of the present disclosure.

Referring to FIG. 5, a plurality of battery supports 150 may be provided on the bottom plate 121 of the lower pack housing 120B, according to an embodiment of the present disclosure.

In one embodiment, the battery support 150 has a height in the Z direction. Accordingly, the battery assembly 110 may be supported by the battery support such that an upper surface of the bottom plate 121 is spaced apart from the battery assembly 110. The height of the battery support 150 may be adjusted to adjust the height and size of the free volume FV.

Figure 6B:
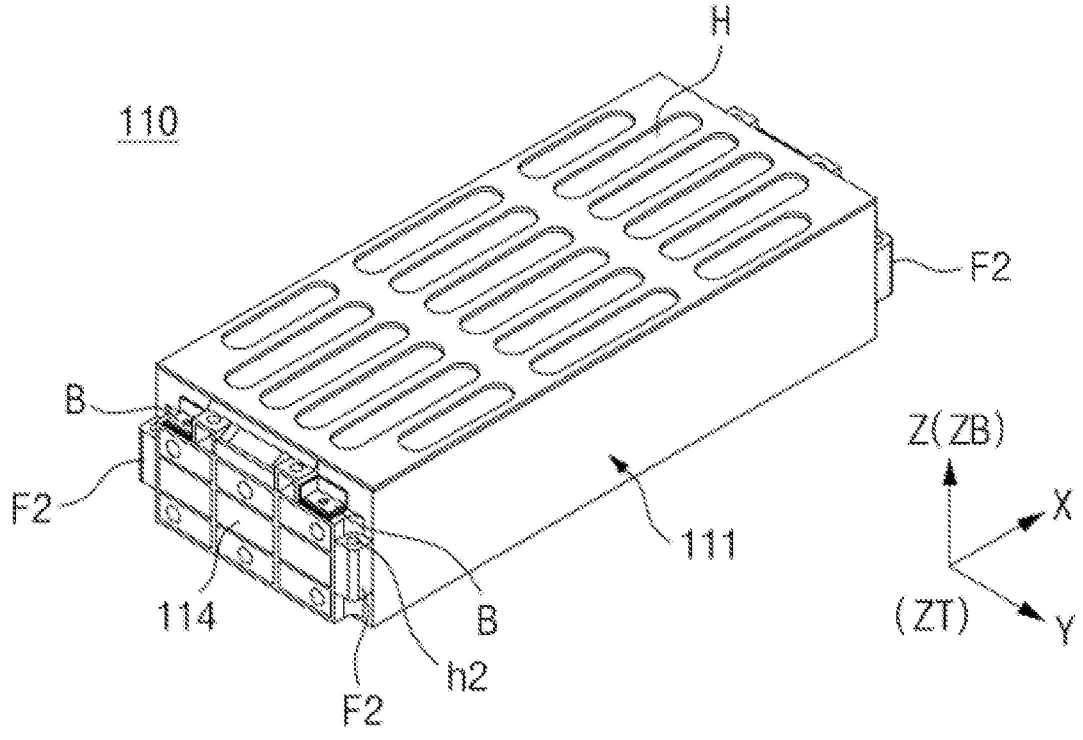
FIG. 6B is a perspective view of a battery assembly accommodated in a battery pack according to an exemplary embodiment.

Corresponding coupling portions that may be coupled to the battery supports 150 may be provided on front and rear surfaces and/or the side surfaces of the battery assembly 110. For example, as shown in FIG. 5, protruding coupling portions F1 fastened to the battery supports 150 may be provided on both side surfaces of the battery assembly. Alternatively, as shown in FIG. 6B, protruding coupling portions F2 fastened to the battery supports 150 may be provided on the front and rear surfaces of the battery module 110A. Predetermined fastening holes into which fastening members may be fastened may be formed in the protruding coupling portions F1 and F2 and the battery supports.

Still referring to FIG. 5, when the battery assembly 110 is coupled to the top plate 120A, the assembly mounting portions 122*a* and 123*a* and the battery supports 150 of the lower pack housing 120B through an adhesive member (for example, the TIM layer 130) and a fastening member, even a heavier battery assembly 110 may be installed in the battery pack.

Still referring to FIG. 5, the battery assemblies 110 may be installed in two rows in the Y direction, but the present disclosure is not limited thereto. One or more rows of the battery assemblies 110 may be disposed in the Y direction. Alternatively, one or more battery assemblies 110 may also be disposed in the X direction.

The battery support 150 may occupy a partial space of the free volume FV, as shown in FIG. 5 for example. The battery supports 150 may be arranged in the battery pack 100 at various intervals to allow deformation of the bottom plate 121 or the like when an external impact or force is exerted on the bottom plate 121. For example, the space between the battery supports 150 may become parts of the free volume FV.

Referring back to FIGS. 3 and 4, the lower pack housing 120B may include exhaust devices 140 on one or more of the sidewalls at the front, rear, left, and right sides. In one embodiment, the exhaust devices 140 may be provided on the side walls 122 and 123, as shown in FIGS. 3 and 4. The sidewalls may include exhaust channels and/or exhaust holes connected to the exhaust devices 140. The exhaust channel and the exhaust hole may be configured to provide a path for discharging or communicating gas and heat from inside the battery pack 100.

When at least one of the plurality of battery assemblies 110 is in a thermal runaway state, the exhaust devices 140 may be configured to discharge or communicate high-temperature gas inside the battery pack 100 to the outside and delay thermal propagation. In this case, the free volume FV becomes a path for quickly moving or communicating gas to the exhaust device 140.

The battery pack 100 may further include electrical components (not shown in the figures for clarity of illustration and explanation). The electrical components may be disposed on the lower pack housing 120B. The electrical components may be disposed between the battery assemblies 110 and the sidewalls on which the exhaust devices 140 may be installed. The electrical components may include any electronic device required to drive the battery pack.

The electrical components may include, for example, a battery management system (BMS). The BMS may be configured to monitor, balance, and control the battery pack.

The electrical components may further include a cooling device, a power relay assembly (PRA), a safety plug, and the like. The cooling device may include a cooling fan. The cooling fan may circulate air inside the battery pack 100 to prevent overheating of each of the plurality of battery assemblies 110.

FIGS. 6 to 10 are perspective views of a battery assembly accommodated in a battery pack according to exemplary embodiments.

FIGS. 6A and 6B illustrate a battery assembly and shows an exploded perspective view (see FIG. 6A) and a combined perspective view (see FIG. 6B) of a battery module 110A.

The battery module 110A includes a battery cell assembly 111, module cases 112 and 113 for accommodating the battery cell assembly 111, and end plates 114 and 115 coupled to front and rear surfaces of the module cases 112 and 113.

The battery cell assembly 111 may be formed, for example, by stacking a plurality of pouch-type battery cells 111*a*. Alternatively, the battery cell assembly 111 may be formed by stacking a plurality of prismatic battery cells, or any other suitable battery cells that can be arranged to form a battery cell assembly.

The module cases may include a lower case 112 and an upper case 113. FIG. 6A illustrates a U-shaped frame including side plates 112*b* and a bottom plate 112*a* as the lower case 112. The shape of the module cases 112 and 113 is not limited to that shown in FIG. 6A, and of course, other types of module cases may be applied as long as the module cases accommodate the battery cell assembly 111.

Busbar frames BFA may be coupled to front and rear surfaces of the battery cell assembly 111. A busbar B for connecting electrode leads of the battery cells 111*a*, a busbar B for electrical connection to another battery module or the outside, and the like may be installed on the busbar frame BFA.

A front end plate 114 and a rear end plate 115 for protecting the busbar frames BFA and the battery cell assembly 111 may be positioned on the front and rear surfaces of the battery cell assembly 111. The front end plate 114 and the rear end plate 115 may be coupled to the module cases 112 and 113 and/or the busbar frames BFA.

If necessary, the module cases 112 and 113, for example, the upper case 113, may be provided with a venting hole H to discharge gas in the module.

A TIM layer 130' including a thermal resin may be disposed on a bottom plate 112*a* of the lower case 112. The TIM layer 130' may be made of a material that is the same as or different from that of the above-described TIM layer 130 disposed between the battery assembly 110 and the top plate 120A. The TIM layer 130' on the bottom plate may fix or attach the battery cell assembly 111 onto the bottom plate 112*a*. Also, the TIM layer 130' may transfer heat from the battery cell assembly 111 to the bottom plate and the lower case 112.

In one embodiment, a TIM layer may be positioned on an inner surface of the upper case 113 in addition or alternatively to the TIM layer 130'. That is, the TIM layer may be disposed between the upper case 113 and an upper surface of the battery cell assembly 111.

The battery cell assembly 111 may be mounted in the lower case 112 of the U-shaped frame, and the upper case 113 may be coupled to the lower case 112 through welding or the like so that the battery cell assembly 111 may be accommodated in between the module cases 112 and 113. The busbar frames BFA may be disposed on the front and rear surfaces of the battery cell assembly 111, and the front end plate 114 and the rear end plate 115 may be coupled thereto, thereby forming the battery module as shown in FIG. 6B.

A cooling device may be provided in at least one of the upper case 113 and the lower case 112. For example, the cooling device may be formed in a structure in which two plates are coupled at an interval in the upper case 113 or the bottom plate 112*a* of the lower case opposite to the upper case 113. In this case, a partition wall may be formed in the interval, and cooling channels CH2 as the cooling device may be disposed in the partition wall. The cooling channel may be positioned on the case side where the TIM layer 130' is formed.

Figure 12:
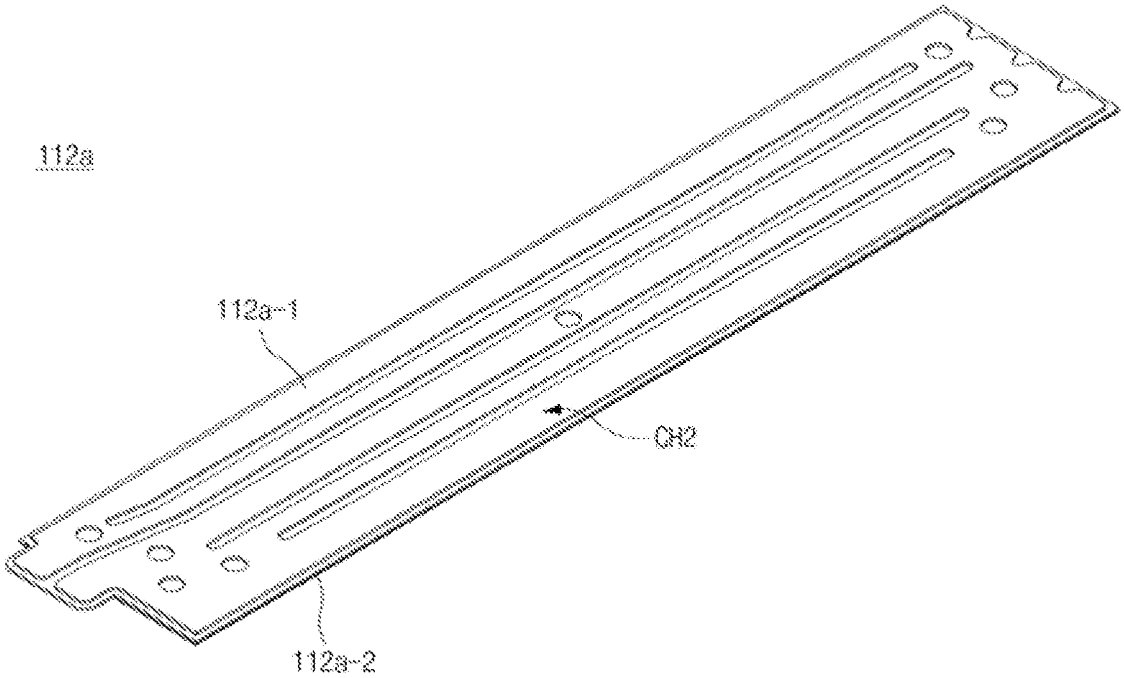
FIG. 12 is a perspective view illustrating a bottom plate of a lower case of the battery assembly of FIG. 11.

If necessary, the TIM layer 130' and the cooling channels CH2, as shown in FIG. 12, may be disposed in both the upper case 113 and the lower case 112.

Referring to FIG. 6B, the battery module 110A may include coupling portions F2 to be coupled to corresponding structures in a battery pack 100, for example, battery supports 150. The coupling portions F2 having fastening holes h2 are provided at both sides of the end plate of the battery module and coupled to the battery supports or the like.

A plurality of battery modules 110A may be disposed in the battery pack 100.

As in the battery module 110A shown in FIGS. 6A and 6B, when the TIM layer 130' is provided in the lower case 112, it is preferable that the bottom plate 112*a* of the lower case be coupled to the top plate 120A of the battery pack shown in FIGS. 3-5. That is, the upper case 113 of the module may be installed to face the bottom plate 121 of the battery pack 100, and the bottom plate 112*a* may be installed to face the top plate 120A. Accordingly, heat generated from the battery cell assembly 111 may be transferred to the lower case 112 through the TIM layer 130'. The heat transferred to the lower case 112 may be transferred to the TIM layer 130 disposed on the top plate 120A and then may be dissipated by the cooling device of the top plate 120A.

Figure 7:
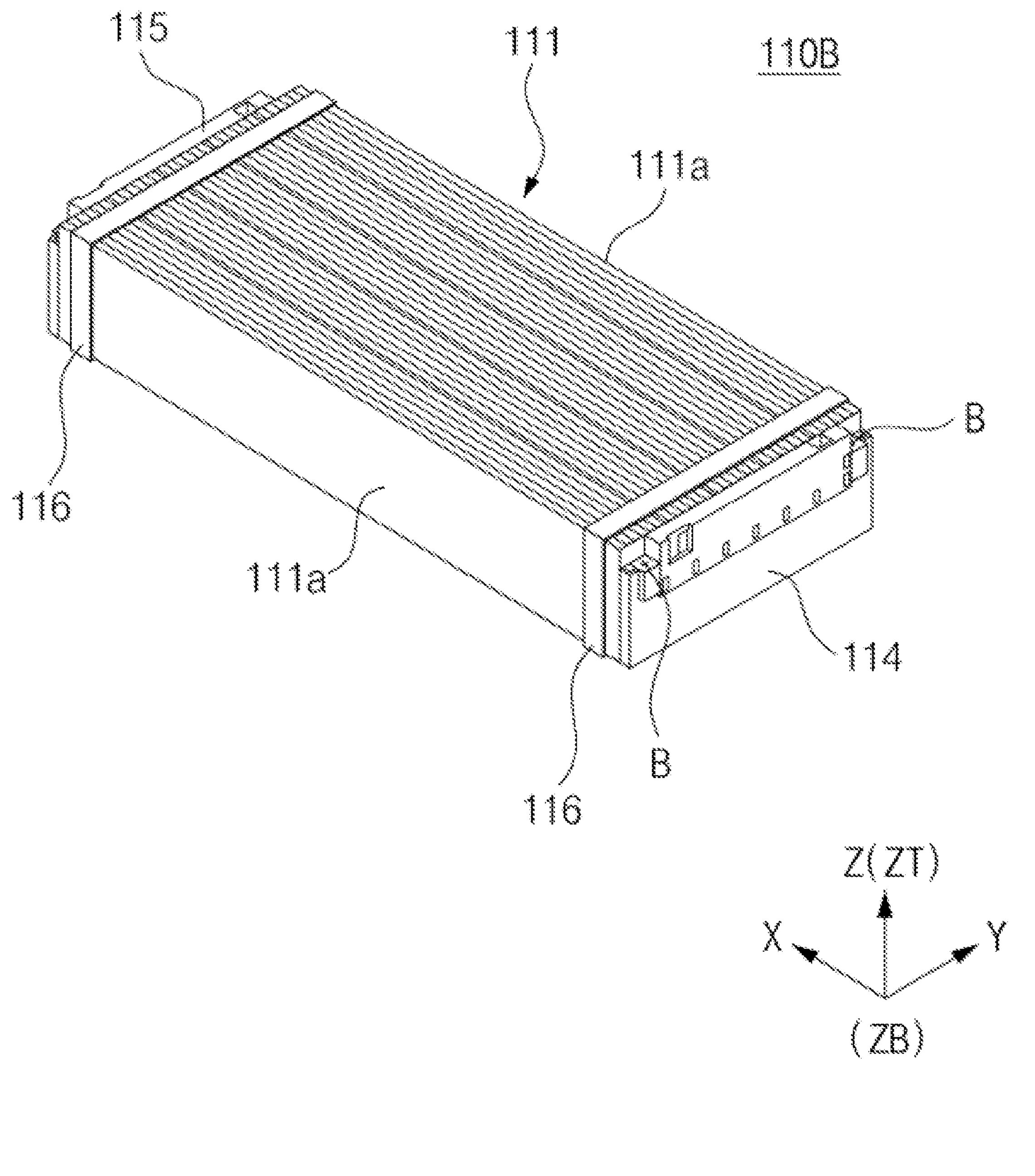
FIG. 7 is a perspective view of a battery assembly according to an exemplary embodiment.

FIG. 7 illustrates a battery cell assembly 111 and a battery assembly 110B in which busbar frames BFA and end plates 114 and 115 are coupled to the front and rear surfaces of a stack. The battery assembly 110B has a moduleless structure in which module cases covering upper, lower, left, and right surfaces of the battery cell assembly 111 are not present.

Battery cells 111*a* are stacked such that side surfaces are in contact with each other, as shown in FIG. 7, and side surfaces of adjacent battery cells may be fixed to each other through double-sided tape. Fixing members may be used to fix the plurality of stacked battery cells 111*a*. For example, the perimeter of the battery cell assembly 111 may be tied using a band 116 as a fixing member.

Figure 8:
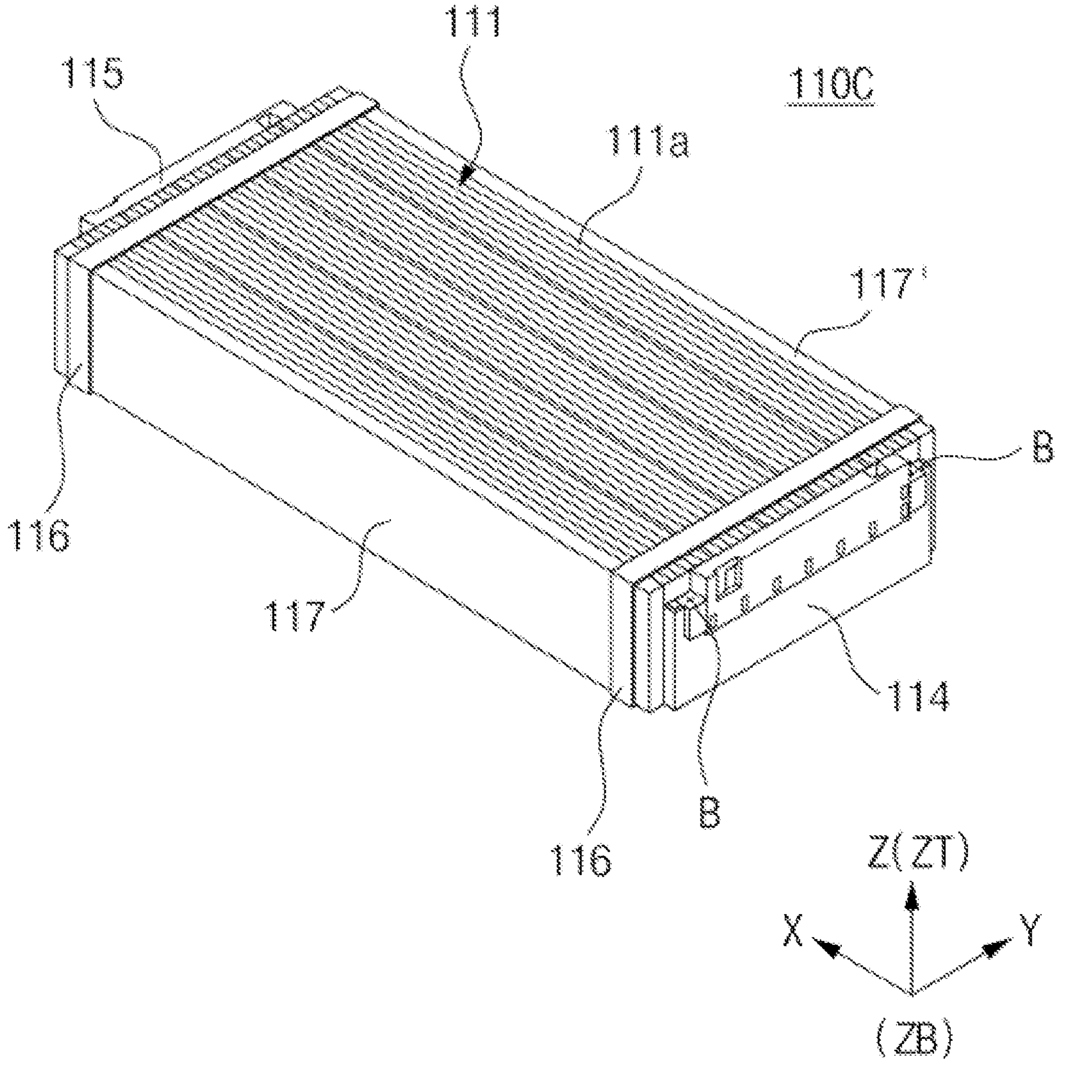
FIG. 8 is a perspective view of a battery assembly according to another exemplary embodiment.

FIG. 8 illustrates a battery cell assembly 111 and a battery assembly 110C in which busbar assemblies and end plates 114 and 115 are coupled to the front and rear surfaces of a stack and a first side plate 117 and a second side plate 117' are coupled to both side surfaces of the battery cell assembly 111. In the battery assembly 110C, the battery cell assembly 111 may also be bound using a band 116 to fix battery cells and the first and second side plates, as shown in FIG. 8.

Busbar frames BFA and the end plates 114, 115 may be formed separately or integrally. Busbars B derived from or parts of the busbar frames BFA may be exposed at the end plates 114 and 115, and the end plates 114 and 115 may be electrically connected to other battery assembles 110 through the busbars B.

In each of the battery assemblies 110B and 110C of FIGS. 7 and 8, upper and lower surfaces of the battery cell assembly 111 may be open or exposed. Accordingly, one surface of the open or exposed upper and lower surfaces of the battery cell assembly 111 may be coupled to a lower surface of a top plate 120A of a battery pack 100. For example, a TIM layer 130 may be disposed between the top plate 120A and the battery cell assembly 111 to couple the battery assembly 110 to the top plate 120A. The other surface of the upper and lower surfaces of the battery cell assembly 111 may be disposed opposite to and facing a bottom plate 121 of the battery pack 100 with an interval or space therebetween, and the interval or space may define a free volume FV.

Figure 9:
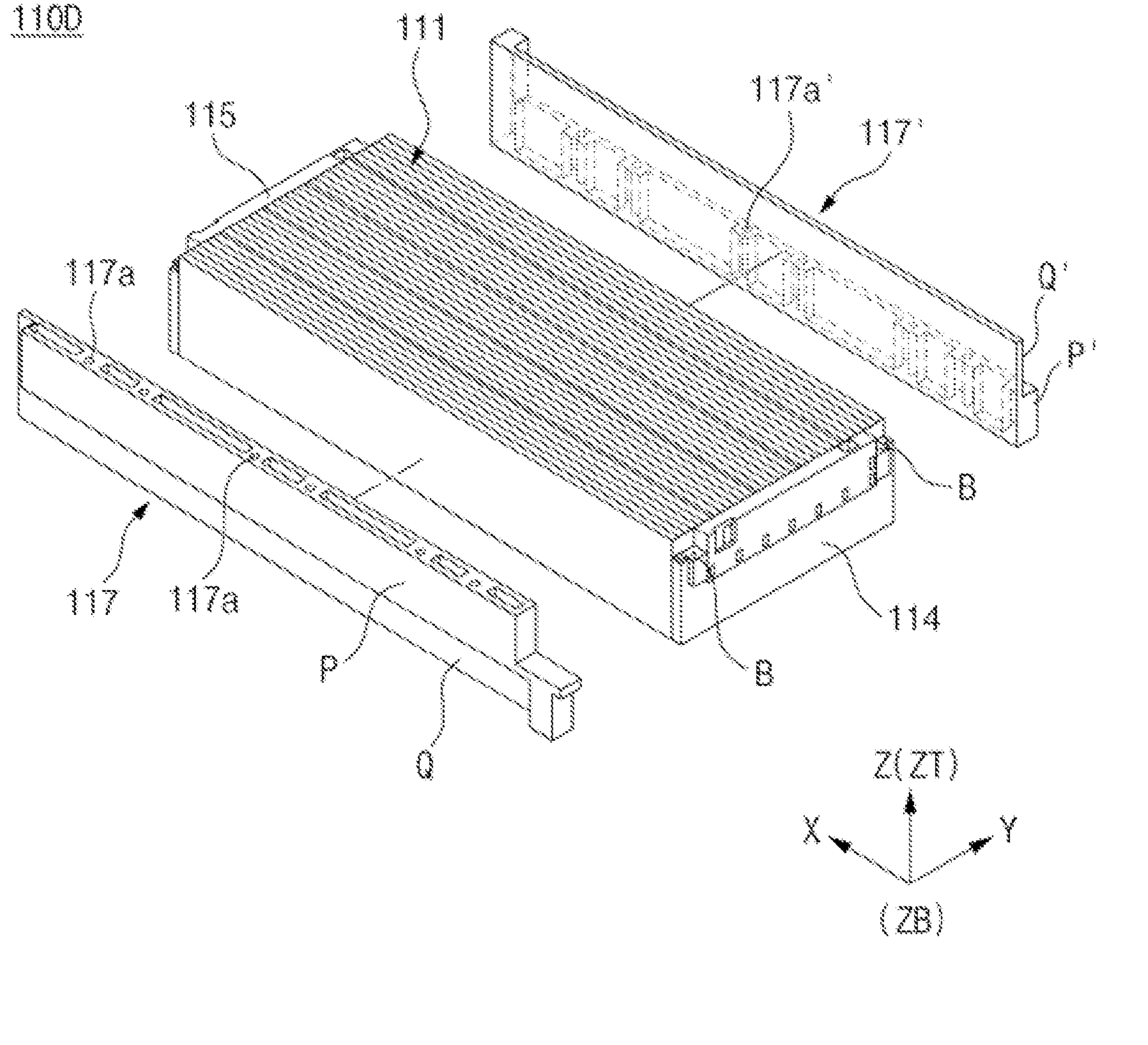
FIG. 9 is a perspective view of a battery assembly according to still another exemplary embodiment.

FIG. 9 illustrates a battery assembly 110D including first and second side plates 117, 117' which have complementary structures that may be configured to be engaged with each other.

Structures of a battery cell assembly 111, busbar frames BFA, and end plates 114 and 115 may be substantially similar to those of the battery assemblies 110B and 110C shown in FIGS. 7 and 8.

A first side plate 117 may be positioned on a first side surface (for example, a left side surface) of the battery cell assembly 111, as shown in FIG. 9. A second side plate 117' may be positioned on a second side surface (for example, a right side surface) of the battery cell assembly 111, as shown in FIG. 9.

Figure 10:
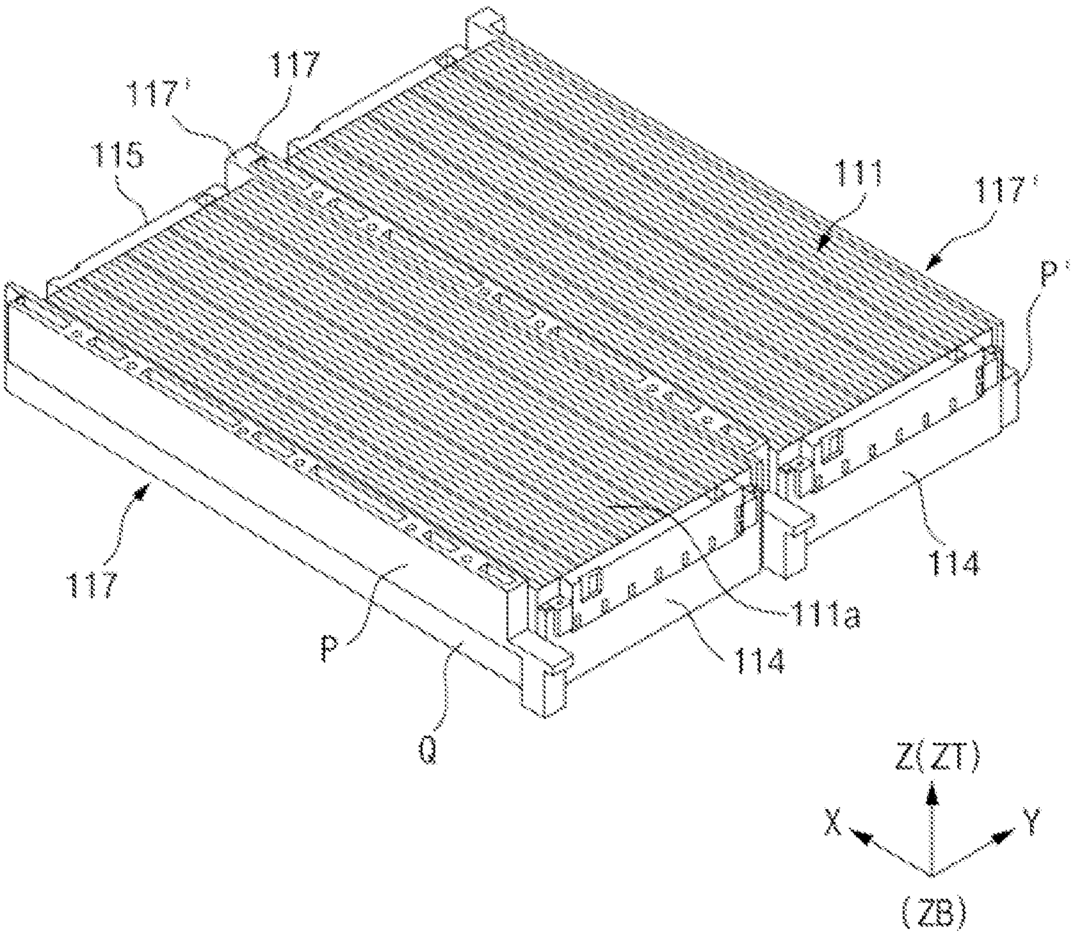
FIG. 10 is a perspective view illustrating a coupling relationship of the battery assembly of FIG. 9.

The first and second side plates 117 and 117' have complementary structures that may facilitate engagement with each other. For example, as shown in FIG. 9, the first side plate 117 may have a stepped structure having a protrusion P at an upper side of a side surface and a concave portion Q at a lower side of the side surface. The second side plate 117' has a stepped structure having a protrusion P' at a lower portion of a side surface and a concave portion Q' at an upper portion of the side surface, as shown in FIG. 9. The stepped structure of the first side plate 117 and the stepped structure of the second side plate 117' are configured to be engaged and matched with each other. Therefore, the first side plate 117 of one battery assembly 110D and the second side plate 117', which may face the first side plate 117, of an adjacent battery assembly 110D may be engaged with each other, and when the first and second side plates 117 and 117' are coupled through a fastening member, adjacent battery assemblies 110D may be coupled to each other. In order to couple the first and second side plates 117 and 117', fastening holes 117*a* and 117*a'* may be formed at the same positions of the side plates 117, 117'. That is, as shown in FIG. 9, the plurality of fastening holes 117*a* may be formed to pass through an upper surface of the protrusion P of the first side plate 117, and the plurality of fastening holes 117*a'* may be formed to pass through the protrusion P' at the lower side of the second side plate 117' at positions corresponding to the fastening holes 117*a*. Accordingly, fastening members, such as bolts, may pass through the fastening holes of the first and second side plates 117 and 117' to be coupled, thereby coupling the first and second side plates 117, 117'. FIG. 10 shows that the first and second side plates 117 and 117' of adjacent battery assemblies 110D that are coupled to each other through such a coupling process described in the foregoing embodiment. An assembly of the first and second side plates 117, 117' may be a partition wall for partitioning adjacent battery cell assemblies 111, as shown in FIG. 10. In one embodiment, the assembly of the first and second side plates 117, 117' may be coupled to the battery supports 150 shown in FIG. 5. In this case, fastening members, such as bolts, may pass through the fastening holes of the first and second side plates 117 and 117' and may be fastened together to corresponding fastening holes formed in the battery supports 150, thereby coupling the first and second side plates 117 and 117' to the battery supports 150.

As shown in the battery assembly 110D of FIG. 10, upper and lower surfaces of the battery cell assemblies 111 may be open or exposed. Accordingly, one surface of the open upper and lower surfaces of the battery cell assembly 111 may be coupled to a lower surface of a top plate 120A of a battery pack 100. For example, a TIM layer 130 may be disposed between the top plate 120A and the battery cell assembly 111 to couple the battery assembly 110 to the top plate 120A. The other surface of the upper and lower surfaces of the battery cell assembly 111 may be disposed opposite to a bottom plate 121 of the battery pack 100 with an interval or space therebetween, and the interval or space may define a free volume FV.

The battery assemblies 110B, 110C, and 110D illustrated in FIGS. 7 to 10 have a moduleless structure in which at least a portion of the module cases 112 and 113 may be removed. Accordingly, the removed portions of the module cases 112 and 113 may simplify the structure of a battery assembly 110, and the weight of the battery assembly 110 may be reduced. Accordingly, the energy density of a battery pack 100 adopting the battery assembly 110 can be further improved.

Figure 11:
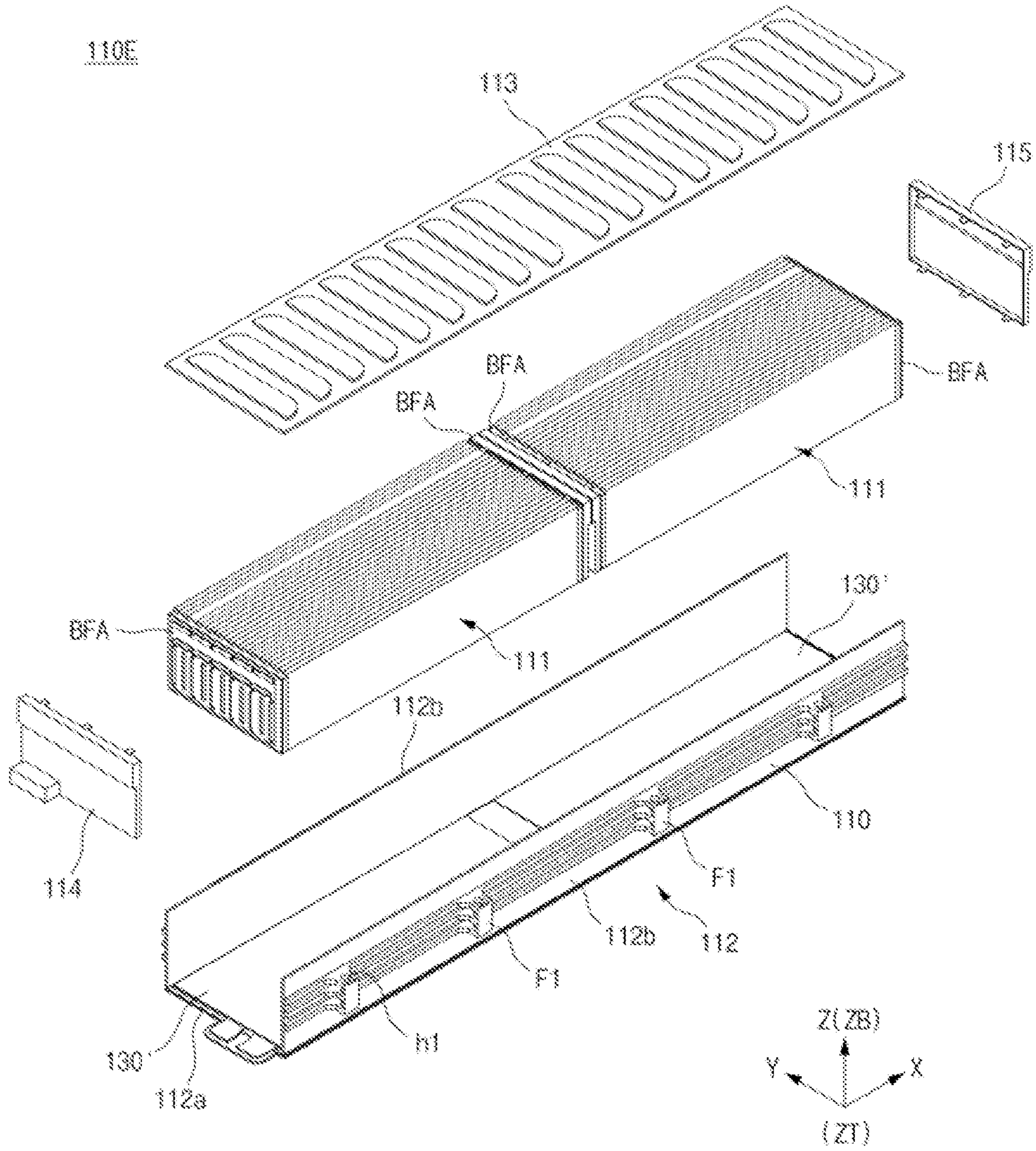
FIG. 11 is an exploded perspective view of a battery assembly according to yet another exemplary embodiment.
Figure 13:
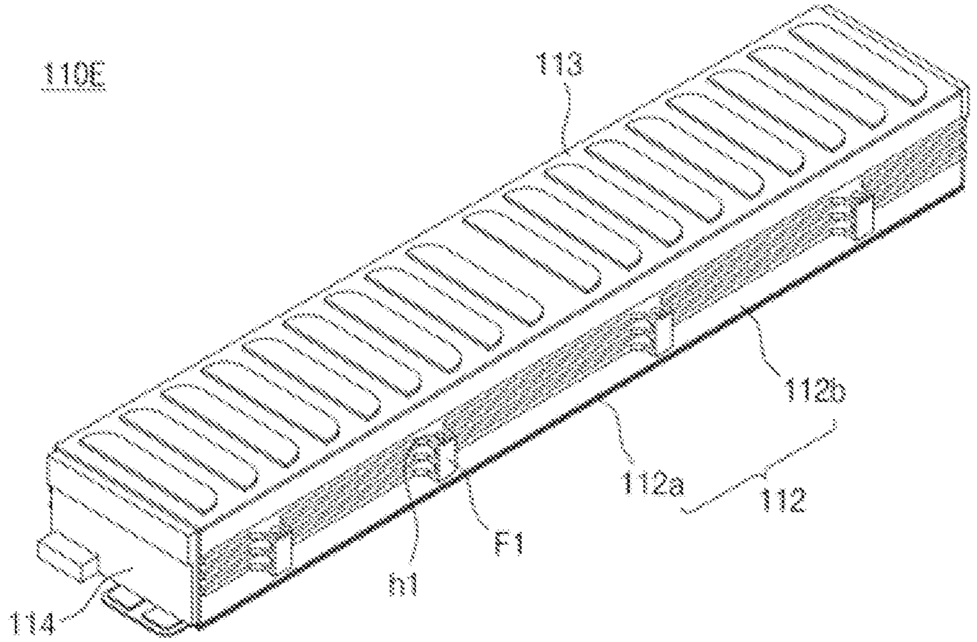
FIG. 13 is a top perspective view of the battery assembly of FIG. 11.
Figure 14:
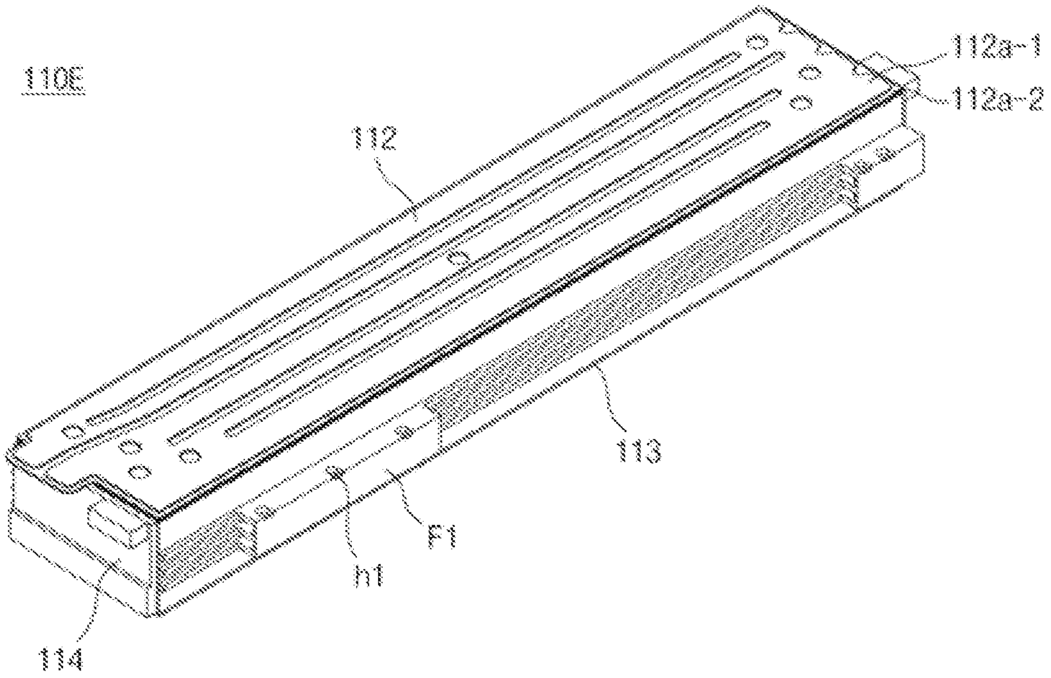
FIG. 14 is a bottom perspective view of the battery assembly of FIG. 11.

FIG. 11 is an exploded perspective view of a battery assembly according to another exemplary embodiment. FIG. 12 is a perspective view illustrating a bottom plate of a lower case of the battery assembly of FIG. 11. FIG. 13 is a top perspective view of the battery assembly of FIG. 11. FIG. 14 is a bottom perspective view of the battery assembly of FIG. 11.

A battery module 110E shown in FIGS. 11-14 may have a similar shape to the battery module of FIGS. 6A and 6B.

In one embodiment, the battery module 110E of FIG. 11 may include a battery cell assembly 111, module cases 112 and 113 for accommodating the battery cell assembly 111, and end plates 114 and 115 coupled to front and rear surfaces of the module cases 112 and 113.

Two battery cell assemblies 111 are arranged in a longitudinal direction, and a rear surface of the front battery cell assembly 111 is coupled to a front surface of the rear battery cell assembly 111. In the illustrated example, the two battery cell assemblies 111 may be connected in the longitudinal direction (X direction), but the present disclosure is not limited thereto. Two or more battery cell assemblies 111 may be connected in X direction.

Two or more battery assemblies 110 may also be disposed in the longitudinal direction inside a battery pack 100. However, in this case, the number of components coupled to each battery cell assembly 110 and the number of module cases for accommodating the battery cell assembly 110 may increase. Accordingly, manufacturing costs may increase, and assembly work of the battery assembly 110 also may become complicated.

In one embodiment, when the plurality of battery cell assemblies 111 are disposed in the longitudinal direction, as shown in FIG. 11, and longitudinal assemblies of the battery cell assemblies 111 are accommodated in one module case (e.g., 112 and 113), the number of components and manufacturing costs can be reduced.

Busbar frames BFA may be coupled to front and rear surfaces of each battery cell assembly 111, as shown in FIG. 11. The busbar frame BFA installed on the rear surface of the front battery cell assembly 111 may be mechanically and electrically coupled to the busbar frame BFA installed on the front surface of the rear battery cell assembly 111.

A front end plate 114 and a rear end plate 115 for protecting the busbar frames BFA and the battery cell assembly 111 may be positioned on front and rear surfaces of the longitudinal assembly of the battery cell assemblies 111. The front end plate 114 and the rear end plate 115 may be coupled to the module cases 112 and 113 and/or the busbar frames BFA. Although two battery cell assemblies 111 are provided, one pair of front and rear end plates is sufficient. Therefore, the number of end plates can be reduced as compared with a case in which the two battery assemblies 110 are installed in the longitudinal direction.

The module cases may include a lower case 112 and an upper case 113. A U-shaped frame including side plates 112*b* and a bottom plate 112*a* as the lower case 112 is shown. However, the shape of the module cases 112 and 113 is not limited to that shown in FIG. 11, and of course, other types of module cases may be applied or utilized as long as the module cases may suitably accommodate the battery cell assembly 111.

In one embodiment, the upper case 113 may be provided with a venting hole to discharge gas in the module.

A TIM layer 130' including a thermal resin may be disposed on a bottom plate 112*a* of the lower case 112. The TIM layer 130' may be made of a material that is the same as or different from that of the above-described TIM layer 130 disposed between the battery assembly 110 and the top plate 120A. The TIM layer 130' on the bottom plate 112*a* may fix the battery cell assembly 111 onto the bottom plate 112*a*. In addition, the TIM layer 130' may transfer heat of the battery cell assembly 111 to the bottom plate 112*a* and the module cases 112 and 113.

If necessary, the TIM layer 130' may be positioned on an inner surface of the upper case 113. That is, the TIM layer 130' may be disposed between the upper case and an upper surface of the battery cell assembly 111.

The battery cell assembly 111 may be mounted in the lower case 112 of the U-shaped frame, and the upper case 113 may be coupled to the lower case 112 through welding or the like so that the battery cell assembly 111 may be accommodated in the module cases 112 and 113. The busbar frames BFA may be disposed on the front and rear surfaces of the battery cell assembly 111, and the front end plate 114 and the rear end plate 115 may be coupled thereto, thereby forming the battery module of the present exemplary embodiment as shown in FIGS. 13 and 14.

In one embodiment, a cooling device may be provided in at least one of the upper case 113 and the lower case 112. For example, the cooling device may be formed in a structure in which two plates are joined together to form cavities or space between the two plates. The cooling device may be provided in the upper case or in the bottom plate 112*a* of the lower case opposite to the upper case. For example, FIG. 12 illustrates a bottom plate 112*a* having such a structure. The bottom plate 112*a* may include an inner plate 112*a*-2 opposite to the battery cell assembly 111 and an outer plate 112*a*-1 opposite to the inner plate 112*a*-2. The inner plate 112*a*-2 and the outer plate 112*a*-1 may be molded to include protrusions and concave portions with various patterns, as shown in FIG. 12. However, any suitable protrusions, shapes, and patterns may be utilized. Therefore, when the inner plate 112*a*-2 and the outer plate 112*a*-1 are coupled, cooling channels CH2 maybe formed between the inner plate 112*a*-2 and the outer plate 112*a*-1 through a combination of protrusions, a combination of a protrusion and a concave portion, and the like, as shown in FIG. 12. For example, the cooling channels CH2 may be formed by the space or volume created when 112*a*-1 and 112*a*-2 are coupled together via any suitable adhesion process (e.g., a brazing method). Thus, the colling channels CH2 are formed by between the inner surface of the protrusions and concave portions. For clarity of illustration and explanation the protrusions and concave portions are shown only on an upper surface of the outer plate 112*a*-1. However, the inner plate 112*a*-2 may also include protrusions and concave portions on a surface opposite to the upper surface of the outer plate 112*a*-1, but is not limited thereto. The cooling channels CH2 may be positioned in the case in which the TIM layer 130' is formed.

In one embodiment, the TIM layer 130' and the cooling channels CH2 may be disposed in both the upper case 113 and the lower case 112.

Referring to FIG. 13, the battery module 110E may include coupling portions to be coupled to corresponding structures in the battery pack 100, for example, battery supports 150. Along the both side plates 112*b* (only one side of the side plate 112*b* is shown for clarity of illustration and explanation and the side plate 112*b* on the opposite side is not shown) of the lower case 112, protruding coupling portions F1 having fastening holes h1 may be provided to be coupled to the battery supports 150. The protruding coupling portions F1 may be spaced apart from each other in a longitudinal direction of the battery module, as shown in FIG. 13. The numbers and shapes of coupling portions disposed on both left and right plates 112*b* of the battery module 110E may be the same or different. In the side plate 112*b* of FIG. 13, four protruding coupling portions F1 may be disposed in the longitudinal direction. On the other hand, in the side plate 112*b* of FIG. 14, two protruding coupling portions F1 may be disposed in the longitudinal direction, and a plurality of fastening holes h1 may be formed in each of the protruding coupling portions F1.

Figure 15:
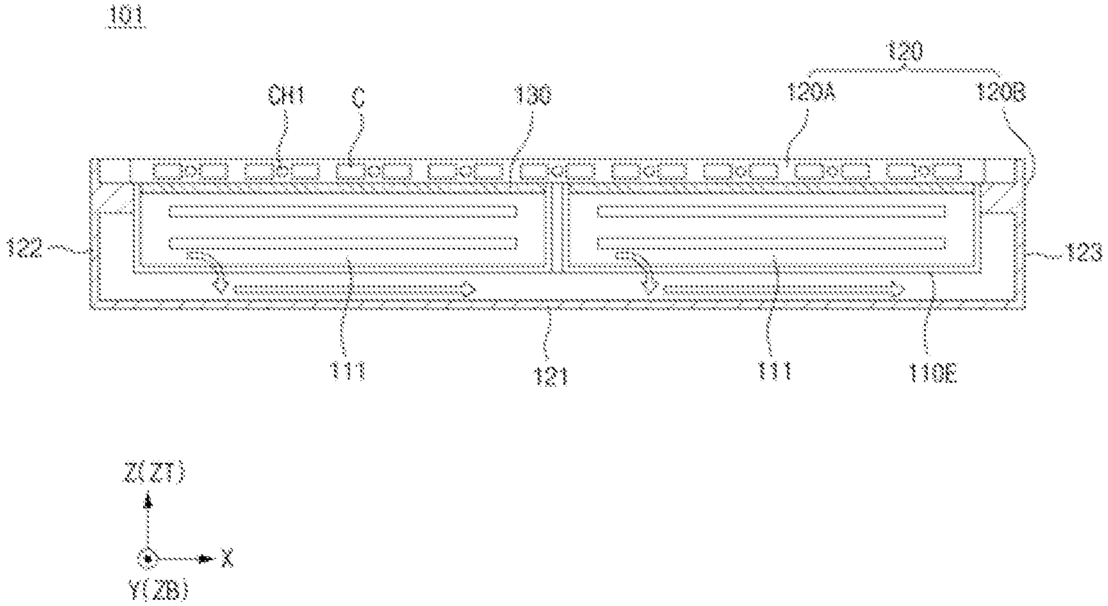
FIGS. 15 and 16 are cross-sectional views of a battery pack according to yet another exemplary embodiment of the present disclosure.
Figure 16:
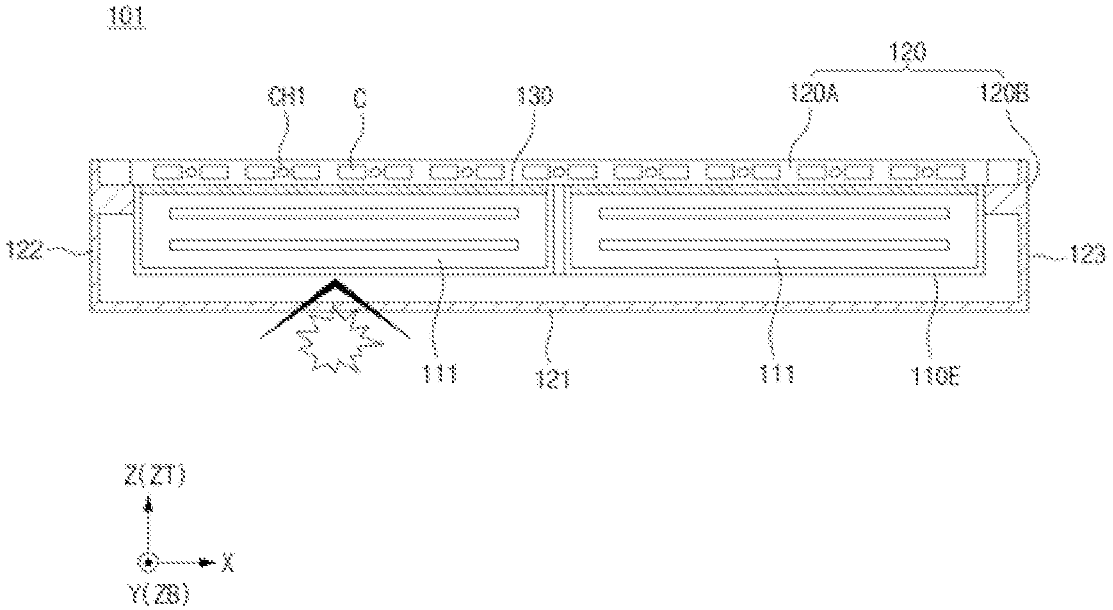

In one embodiment, a plurality of battery modules 110E may be disposed in the battery pack 101 shown in FIGS. 15-16.

As in the battery module 110E shown in FIG. 11, when the TIM layer 130' and the cooling channels CH2 are provided in the lower case, it is preferable that the bottom plate 112*a* of the lower case 112 be coupled to the top plate 120A of the battery pack 100 or 101. That is, the upper case 113 of the module may be installed to face the bottom plate 121 of the battery pack 100 or 101, and the bottom plate 112*a* may be installed in the battery pack to face the top plate 120A. Accordingly, heat of the battery cell assembly 111 may be transferred to the lower case through the TIM layer 130' of the lower case. The heat transferred to the lower case 112 may be dissipated by the cooling channel CH2 of the lower case 112.

Accordingly, since the heat transferred from the battery module 110E to the top plate 120A may be dissipated, passengers in the passenger compartment can be protected.

In this embodiment, when a cooling device CH1 is provided in the top plate 120A, such a cooling effect can be further doubled. For example, since the cooling device is provided in both the lower case of the battery assembly 110 and the top plate 120A of a pack housing 120, heat transferred to an upper portion of a pack 100 or 101 can be more reliably dissipated. Therefore, an effect of protecting the passenger compartment is further doubled. For example, heat may be transferred through a path of the TIM layer 130' to cooling channel CH2 to TIM layer 130 to cooling channel CH1.

FIGS. 15 and 16 are cross-sectional views of the battery pack 101 including the battery assembly (battery module) of FIGS. 11 to 14.

As shown, the bottom plate 112*a* of the lower case of the battery module 110E is suspended and supported by the top plate 120A of the pack through the TIM layer 130'. In addition, an upper surface of the upper case 113 of the battery module maybe spaced apart from the bottom plate 121, and such a separation space may form a free volume FV.

Two battery cell assemblies 111 may be installed in the battery module 110E in the longitudinal direction so that a required electric capacitance may be obtained with a simple structure.

According to the battery pack of the present exemplary embodiment, even when an impact is applied to the battery pack 101 from below, the free volume FV can absorb, for example, deformation of the bottom plate 121, and thus damage to the battery assembly 110 can be prevented.

In addition, even when gas and flames are generated due to a thermal runaway, the free volume FV serves as a venting path to rapidly discharge or communicate the gas to the outside of the battery pack. In this case, an exhaust device 140 may be provided on a sidewall of the battery pack as shown in FIG. 3. Thus, it is possible to facilitate the discharge of gas.

In addition, a thermal resin layer such as the TIM layer 130 may be provided on a lower surface of the top plate 120A of the battery pack, thereby transferring heat from the battery module 110E to the top plate 120A. The top plate 120A may include the cooling channel CH1 so that heat can be dissipated or easily emitted to the outside.

Figure 17:
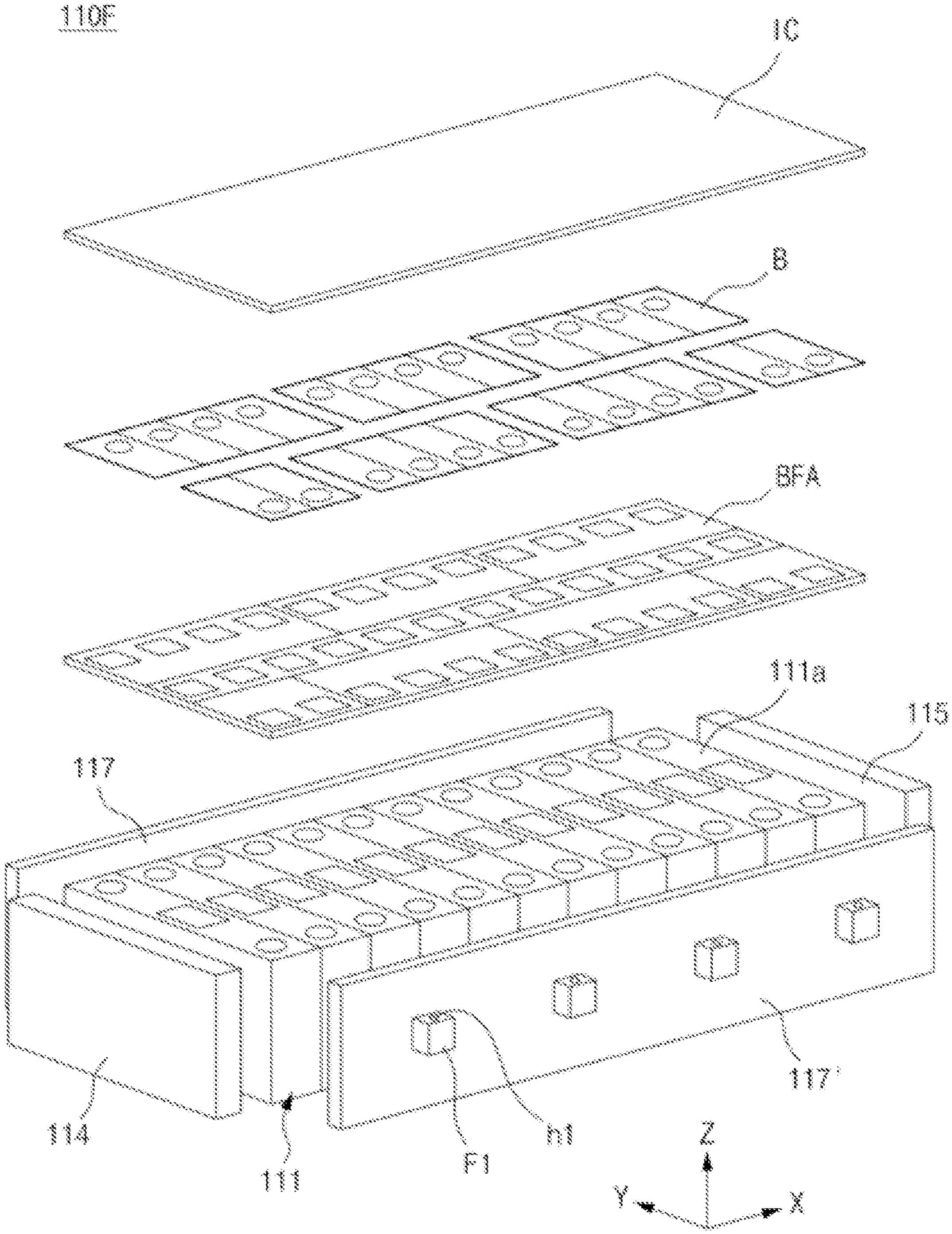
FIG. 17 is a perspective view of a battery assembly according to yet another exemplary embodiment.

FIG. 17 is a perspective view of a battery assembly 110F according to another exemplary embodiment.

FIG. 17 illustrates a structure of the battery assembly 110F including prismatic battery cells 111*a*.

The battery assembly 110F of FIG. 17 may include a battery cell assembly 111, a first side plate 117, a second side plate 117', a busbar frame BFA, and busbars mounted on the busbar frame BFA. In addition, for insulation, an insulating cover IC may be provided on the busbar B.

The prismatic battery cells 111*a* may be stacked in X direction to form the battery cell assembly 111. The busbar frame BFA (busbar carrier) is disposed on an upper surface of the battery cell assembly 111. The busbars B, such as an inter-busbar and a terminal busbar, may be mounted on the busbar frame BFA. One or more bands (not shown for clarity if illustration and explanation) may be provided along the perimeter of the battery cell assembly to fix the battery cell assembly 111. In addition, a front end plate 114 and a rear end plate 115 covering front and rear ends of the battery cell assembly 111 may be provided, as shown in FIG. 17.

The first side plate 117 and the second side plate 117' may be provided with coupling portions for coupling to corresponding structures in a battery pack, for example, battery supports 150. That is, in a longitudinal direction (X direction) of the first side plate 117 and the second side plate 117', protrusion coupling portions F1 having fastening holes h1 may be provided. In one embodiment, the protruding coupling portions F1 may be spaced apart from each other in the longitudinal direction of the battery module 110F. The numbers and shapes of coupling portions disposed on the first side plate 117 and the second side plate 117' of the battery assembly 110F may be the same or different.

The battery assembly 110F of the present exemplary embodiment may be accommodated in a pack housing 120 of the battery pack 100 or 101, and one surface of the battery assembly 110F may be suspended and supported by a top plate 120A of the pack housing. For example, at least one surface of upper and lower surfaces of the battery cell assembly 111 may be coupled to a lower surface of the top plate 120A through, for example, a TIM layer 130. If necessary, the battery assembly 110F may be fastened to the top plate 120A and/or a lower pack housing 120B. Alternatively, the protruding coupling portion F1 of the battery assembly 110F may be coupled to the battery support 150 provided on a bottom plate 121 of the pack 100 or 101, thereby securely supporting the battery assembly 110F in the pack. In this case, a free volume FV is provided between a lower surface of the battery assembly 110F and the bottom plate 121.

Although not shown, the battery assembly 110F of FIG. 17 may further include an upper case for covering the upper surface of the battery cell assembly 111 and/or a lower case for covering the lower surface of the battery cell assembly 111.

For example, the upper case may be positioned on the insulating cover IC. Alternatively, the lower case may be positioned below the battery cell assembly 111. The upper case and/or the lower case may be coupled to the first and second side plates 117, 117'. In this case, the upper and lower cases and the first and second side plates may form a module case of the battery cell assembly 111.

The battery assembly 110F including the upper case or the lower case may be suspended and supported by the top plate 120A of the pack housing 100 or 101.

In one embodiment, a cooling device may be provided in the upper case or the lower case. For example, the case including the cooling device may be coupled to the top plate 120A.

In one embodiment, the case of the battery assembly 110F facing the free volume FV may have a venting hole. As a result, gas generated from the battery cell assembly 111 may be discharged to the outside of the battery assembly 110F.

Figure 18:
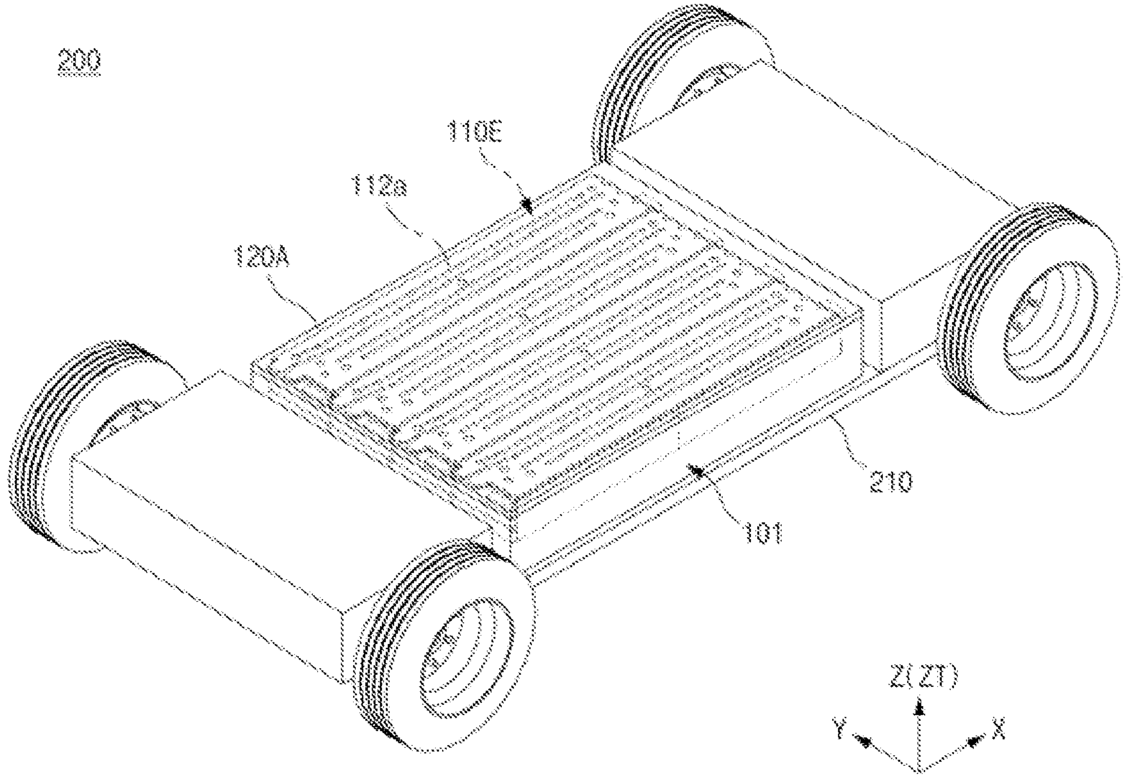
FIG. 18 is a schematic view illustrating a structure of an electric vehicle equipped with a battery pack according to the present disclosure.

FIG. 18 is a schematic view illustrating a structure of an electric vehicle 200 equipped with a battery pack according to the present disclosure.

For simplicity of illustration, only a body frame 210 constituting a lower frame of a vehicle, the battery pack 101 coupled to the body frame 210, and tires are shown.

The battery pack 100 or 101 according to the present disclosure may be mounted on the body frame 210. The battery pack 100 or 101 does not have a structure in which a battery assembly is installed on the bottom of a pack as in the related art, but has a structure in which a battery assembly 110 is suspended and supported by a top plate 120A of a battery pack. That is, since there is no space between the battery assembly (battery module 110E) and the top plate 120A, it is possible to prevent gas generated from the battery assembly from being transferred to a passenger compartment at an upper side of the vehicle. The gas is guided to a free volume FV positioned between the battery assembly 110 and a bottom plate 121 of the battery pack. That is, since there is no space above the battery pack, the gas is guided to the free volume FV below the battery pack. The gas can flow through the free volume FV to be discharged to a lower portion of the vehicle through an exhaust device installed in the battery pack.

The bottom plate 121 of the battery pack is mounted or supported by the body frame 210. In this case, since an impact may occur from the body frame 210 at a lower side of the vehicle, the bottom plate 121 may be deformed. The battery pack of the present disclosure includes the free volume FV between the battery assembly 110 and the bottom plate 121. Accordingly, even when the bottom plate 121 is deformed, the battery assembly 110 can be prevented from being damaged.

As such, according to a battery pack of the present disclosure and an electric vehicle equipped with the battery pack, the safety of passengers can be strengthened. In addition, it is possible to protect a battery assembly 110, which is a core component, and improve the durability of the battery pack and the electric vehicle.

The present disclosure has been described above in more detail through the drawings and exemplary embodiments. However, the configurations described in the drawings or the exemplary embodiments in the specification are merely exemplary embodiments of the present disclosure and do not represent all the technical ideas of the present disclosure. Thus, it is to be understood that there may be various equivalents and variations in place of them at the time of filing the present application.

DESCRIPTION OF REFERENCE NUMERALS

100, 101: battery pack
110: battery assembly

120: pack housing
120A: top plate
120B: lower pack housing
130: TIM layer
140: exhaust device
200: electric vehicle
210: vehicle body frame

What is claimed is:

1. A battery pack comprising:
a housing comprising an opening and a first surface opposite the opening;
a battery assembly accommodated in the housing; and
a first cover coupled to the housing and covering the opening,
wherein a first side of the battery assembly is coupled to a first side of the first cover such that the battery assembly is suspended from and supported by the first cover,
wherein a second side of the battery assembly is spaced apart from the first surface of the housing by a free volume and substantially the entire surface of the second side of the battery assembly is exposed to the free volume,
wherein the free volume extends along a longitudinal direction of the battery assembly,
wherein the battery assembly includes a cell assembly including a battery cell,
wherein the battery assembly optionally includes a first cell assembly cover coupled to a first side of the cell assembly and comprising a ventilation opening,
wherein the cell assembly is exposed to the free volume or the free volume communicates through the ventilation opening,
wherein the housing further comprises a sidewall coupled to a first edge of the first surface,
wherein the housing comprises a mounting portion on the sidewall, and
wherein the battery assembly is coupled to the mounting portion.

2. The battery pack of claim 1, wherein the first side of the battery assembly is attached to the first side of the first cover.

3. The battery pack of claim 1, further comprising a first layer between the battery assembly and the first cover.

4. The battery pack of claim 1, wherein the first cover comprises a cooling channel between the first side of the first cover and a second side of the first cover, and
wherein the first side of the first cover is opposite the second side of the first cover.

5. The battery pack according to claim 1, wherein the battery assembly is fastened to the first cover and/or the housing.

6. The battery pack of claim 1, wherein the first cover is coupled to the mounting portion.

7. The battery pack of claim 1, wherein the housing further comprises an exhaust portion.

8. The battery pack of claim 1, wherein the housing further comprises a support structure on the first surface, and
wherein the battery assembly is coupled to the support structure.

9. The battery pack of claim 1, wherein the battery assembly further comprises a busbar coupled to at least one side of the cell assembly.

10. The battery pack of claim 9, wherein the battery assembly further comprises a second cover, and
wherein the second cover is coupled to a second side of the cell assembly.

11. The battery pack of claim 10, wherein the battery assembly further comprising a first layer,
wherein the first layer comprises a thermal interface material (TIM),
wherein the TIM comprises a thermal resin, and
wherein the first layer is on a surface of the second cover.

12. The battery pack of claim 10, wherein the battery assembly further comprises:
a third cover coupled to a third side of the cell assembly; and
a cooling portion on at least one of the second cover or the third cover.

13. The battery pack of claim 9, wherein the battery assembly further comprises a second cover coupled to a second side of the cell assembly and a third cover coupled to a third side of the cell assembly.

14. The battery pack of claim 13, wherein the second cover has a first shape and the third cover has a second shape, and
wherein the first shape and the second shape are configured to correspond with each other for coupling.

15. The battery pack of claim 9, wherein the battery assembly further comprises a busbar frame including the busbar.

16. The battery pack of claim 1, wherein the battery assembly comprises a first cell assembly and a second cell assembly,
wherein the first cell assembly comprises a first busbar and a second cell assembly comprise a second busbar, and
wherein the first cell assembly is coupled to the second cell assembly via the first busbar and the second busbar.

17. The battery pack of claim 1, wherein the battery assembly comprises:
the first cell assembly cover coupled to the first side of the cell assembly;
a second cell assembly cover coupled to a second side of the cell assembly; and
a layer between the second cell assembly cover and the second side of the cell assembly,
wherein the first cell assembly cover comprises the ventilation opening formed therethrough and does not comprise a cooling channel, and
wherein the second cell assembly cover comprises a cooling channel.

18. A vehicle comprising:
a battery pack comprising:
a housing including an opening and a surface opposite the opening;
a cover configured to cover the opening; and
a battery assembly coupled to the cover and spaced part from the surface by a free volume; and
a frame,
wherein the housing further comprises a sidewall coupled to an edge of the cover,
wherein the housing comprises a mounting portion on the sidewall,
wherein the battery assembly is coupled to the mounting portion,
wherein substantially the entire surface of the battery assembly facing the surface of the housing is exposed to the free volume,
wherein the free volume extends along a longitudinal direction of the battery assembly,
wherein the battery assembly includes a cell assembly including a battery cell, wherein the battery assembly optionally includes a first cover coupled to a first side of the cell assembly and comprising a ventilation opening, wherein the cell assembly is exposed to the free volume or the free volume communicates through the ventilation opening, wherein the battery pack is accommodated in the frame, wherein a passenger compartment is above at least a first portion of the battery pack, and wherein the frame is under at least a second portion of the battery pack.

* * * * *